(12) United States Patent
Sasaki

(10) Patent No.: US 6,231,480 B1
(45) Date of Patent: *May 15, 2001

(54) LOCKUP CONTROL SYSTEM FOR FLUID COUPLING OF AUTOMATIC TRANSMISSION

(75) Inventor: Kazuo Sasaki, Hiroshima (JP)

(73) Assignee: Mazda Motor Corporation, Hiroshima (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,382

(22) Filed: May 8, 1998

(30) Foreign Application Priority Data

May 12, 1997 (JP) ...................................... 9-137545

(51) Int. Cl.⁷ ............................. B60K 41/02; F16D 33/00
(52) U.S. Cl. ............................................. 477/174; 192/3.29
(58) Field of Search .................................. 192/3.29, 3.3, 192/3.31; 477/169, 174, 175, 176, 180, 901; 701/617

(56) References Cited

U.S. PATENT DOCUMENTS

| 5,085,301 | | 2/1992 | Imamura et al. . | |
|---|---|---|---|---|
| 5,115,897 | * | 5/1992 | Yoshimura et al. | 477/65 |
| 5,434,780 | * | 7/1995 | Kume et al. | 192/3.29 X |
| 5,609,547 | | 3/1997 | Matsushita et al. . | |
| 5,743,829 | * | 4/1998 | Tanizawa et al. | 477/174 |
| 5,816,979 | * | 10/1998 | Shiiba et al. | 477/174 X |

FOREIGN PATENT DOCUMENTS

| 197 17 355 A1 | | 11/1997 | (DE) . | |
|---|---|---|---|---|
| 0367551 | * | 5/1990 | (EP) | 192/3.29 |
| 0 760 443 A2 | | 8/1996 | (EP) . | |
| 2 183 308 | | 6/1987 | (GB) . | |
| 63-13060 | | 3/1988 | (JP) . | |
| 5-71626 | | 3/1993 | (JP) . | |
| 7-279700 | | 10/1995 | (JP) . | |

* cited by examiner

Primary Examiner—Sherry Estremsky
Assistant Examiner—Roger Pang
(74) Attorney, Agent, or Firm—Nixon Peabody, LLP; Donald R. Studebaker

(57) ABSTRACT

Lockup control system for engaging a lockup clutch to lock a fluid coupling to transmit engine output torque directly to an automatic transmission gear mechanism and disengaging the lockup clutch to unlock the fluid coupling to multiply engine output torque and transmit it to the automatic transmission gear mechanism causes a gear shift of the transmission gear mechanism to a gear in which engine brake is applied more effectively when a downhill slope is greater than a specified slope and controls the lockup clutch to relax in engagement when the gear shift is caused resulting from detection of a downhill slope greater than the specified slope.

4 Claims, 20 Drawing Sheets

FIG. 5

| ELEMENT / RANGE | REVERSE CLUTCH | COAST CLUTCH | FORWARD CLUTCH | 3-4 CLUTCH | LOW-REVERSE BRAKE | 2-4 BRAKE | 1ST ONE-WAY CLUTCH | 2ND ONE-WAY CLUTCH |
|---|---|---|---|---|---|---|---|---|
| PARK | | | | | | | | |
| REVERSE | ◯ | | | | | | | |
| NEUTRAL | | | | | | | | |
| DRIVE 1ST GEAR | | | ◯ | | | | ◯* | ◯* |
| DRIVE 2ND GEAR | | | ◯ | | | ◯ | ◯* | |
| DRIVE 3RD GEAR | | ◯ | ◯ | ◯ | | | ◯* | |
| DRIVE 4TH GEAR | | | ◯ | ◯ | | ◯ | | |

◯* Locked but does not transmit power

FIG. 8

| GEAR | 3-4 CLUTCH | 2-4 BRAKE | | | SOLENOID | | |
|---|---|---|---|---|---|---|---|
| | | BAND | S/A | S/R | SOL1 | SOL2 | SOL3 |
| 1ST GEAR | × | × | × | × | × | ○ | ○ |
| 2ND GEAR | × | ○ | ○ | × | ○ | ○ | ○ |
| 3RD GEAR | ○ | × | ○ | ○ | × | × | × |

FIG. 9

| SOLENOID PATTERN | 1 | 2 | 3 | 4 | 5 | 6 | 7 | 8 |
|---|---|---|---|---|---|---|---|---|
| SOL1 | OFF | ON | OFF | OFF | ON | OFF | ON | ON |
| SOL2 | OFF | OFF | ON | OFF | ON | ON | ON | OFF |
| SOL3 | OFF | OFF | OFF | ON | OFF | ON | ON | ON |
| GEAR | 3RD | 3RD | 1ST | 3RD | 2ND | 1ST | 2ND | 4TH |

LOCKUP CONTROL SYSTEM FOR FLUID COUPLING OF AUTOMATIC TRANSMISSION

BACKGROUND OF THE INVENTION

1. Field of the Invention

The invention relates to a control system for a fluid coupling of an automatic transmission equipped with a lockup clutch, and, more particularly, to a lockup clutch control system for a fluid coupling of an automatic transmission which controls engagement of a lockup clutch during traveling downhill.

2. Description of the Related Art

Typically, a control system for an automatic transmission equipped with a fluid coupling, such as a torque converter, performs a downslope gear shift or slope control which refers to the control which causes a down shift of the automatic transmission from a higher gear, for example a fourth gear, to a lower gear, for example a third gear, to apply engine brake more effectively during traveling on a downslope.

With an automatic transmission equipped with a fluid coupling incorporating a lockup clutch, when the lockup clutch is changed in operation from a disengaged mode in which the fluid coupling is unlocked to allow relative rotation between a pump as a rotation input element and a turbine as a rotation output element of the fluid coupling to a full-engagement mode in which the pump and turbine of the fluid coupling is locked together or a slip mode in which the lockup clutch is allowed to slip for a gear shift during traveling downhill, deceleration is felt by the driver as a drawing shock due to overlapped shocks resulting from the change in operation mode of the lockup clutch and a down shift and a feeling of deceleration is intensified due to increased reverse torque transmitted to the engine from driving wheels.

There have been proposed on-slope gear shift control systems which cause a gear shift according to downslopes and upslopes. Such an on-slope gear shift control system is known from, for example, Japanese Unexamined Patent Publication No. 5-716262. Lockup clutch slip control has been known in various forms one of which is described in, for example, Japanese Unexamined Patent Publication No. 3-13060. However, there has been neither discussion regarding an enhanced and unpleasant feeling of deceleration occurring in an automatic transmission coupled with these features nor suggestion regarding how to relieve the enhanced and unpleasant feeling of deceleration.

SUMMARY OF THE INVENTION

It is an objective of the invention to provide a lockup clutch control system for a fluid coupling of an automatic transmission which prevents drawing shocks due to overlapped shocks resulting from a change in operation mode of the lockup clutch and a down shift during deceleration on a downslope and a feeling of deceleration intensified due to increased reverse torque transmitted to the engine from driving wheels.

The foregoing objects of the present invention are achieved by providing a lockup control system for controlling engagement of a lockup clutch for a fluid coupling through which driving torque is transmitted to a transmission gear mechanism of an automatic transmission from an engine such that the lockup clutch is engaged to lock an input element and an output element of the fluid coupling together when and disengaged to unlock the fluid coupling to allow relative rotation between the input element and the output element of the fluid coupling when disengaged. The lockup control system includes an engagement control means for controlling the lockup clutch to be engaged in different states including an engagement state in which the lockup clutch is completely engaged and a slip mode in which the lockup clutch is engaged but allowed to slip, a driving condition detecting means for detecting driving conditions of the vehicle including at least a slope of road on which the vehicle is traveling, a shift control means for shifting the transmission gear mechanism into desired gears according to the driving conditions, and a control means for controlling the shift control means to cause a gear shift of the transmission gear mechanism to a gear in which engine brake is more effected when a detection of a downhill slope greater than a specified slope is made by the driving condition detecting means, and controlling the engagement control means to relax engagement of the lockup clutch when the gear shift is caused resulting from the detection of a downhill slope greater than the specified slope.

The lockup control system may control the shift control means to cause a gear shift of the transmission gear mechanism to a lower gear in which engine brake is more effective than in a higher gear when the detection of a downhill slope greater than the specified slope is made while the transmission gear mechanism is in the higher gear and controls engagement control means to change engagement of the lockup clutch so as to allow relative rotation between the input element and the output element of the fluid coupling when a gear shift from the higher gear to the lower gear is caused due to a change in driving condition independent from a downhill slope greater than the specified slope and to disengage the lockup clutch when the gear shift from the higher gear to the lower gear is caused due to the detection of a downhill slope greater than the specified slope.

With the lockup control system of the invention, when the vehicle is traveling on a downslope sharper than a specified slope, the automatic transmission is shifted to a lower gear to apply engine brake more effectively and engagement of the lock up clutch is released after the down shift. As a result, the automatic transmission is prevented from suffering an overlapped shock resulting from a change in operation mode of the lockup clutch and a down shift during deceleration on a downslope and from providing enhanced deceleration due to increased reverse torque transmitted to the engine, which always lead to an enhanced and unpleasant feeling of deceleration. Further, when the automatic transmission is shifted to a lower gear, for example a third gear from a higher gear, for example a fourth gear, in which engine brake is applied more effectively while the vehicle is traveling on a downslope sharper than a specified slope, engagement of the lockup clutch is released in the lower gear. The automatic transmission is prevented from providing an enhanced feeling of deceleration due to an overlapped shock resulting from a change in operation mode of the lockup clutch and a down shift during deceleration on a downslope.

BRIEF DESCRIPTION OF THE DRAWINGS

The foregoing and other objects and features of the present invention will be clearly understood from the following detailed description of preferred embodiments when read in conjunction with the accompanying drawings in which:

FIG. 5 is a table of operations of brake and clutch elements of the automatic transmission in various ranges;

FIG. 8 is a table of operations of solenoids in the hydraulic control circuit;

FIG. 9 is a table showing the relation between operated pattern of solenoids and gear;

DETAILED DESCRIPTION OF THE PREFERRED EMBODIMENT

The term "rear side" used herein refers to one of axial opposite sides of a transmission gear mechanism or its part remote from a torque converter and the term "front side" used herein refers to another axial side of the transmission gear mechanism or its part close to the torque converter.

Figure 1:
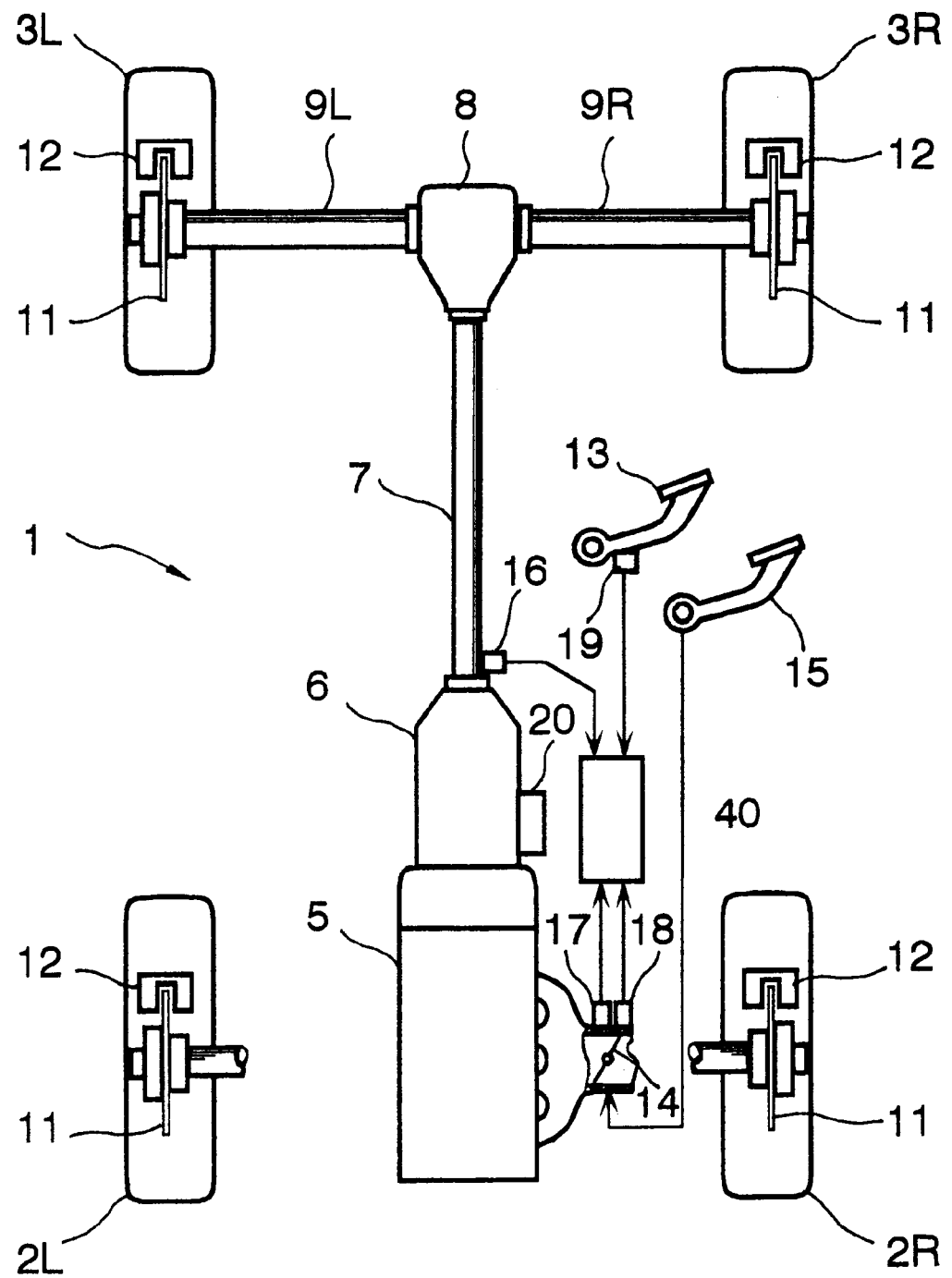
FIG. 1 is a schematic view of a vehicle having an automatic transmission equipped with a torque converter controlled by a hydraulic control system of the invention.

Referring to the drawings in detail and, in particular, to FIG. 1 showing a vehicle having an automatic transmission equipped with a torque converter control system in accordance with an embodiment of the invention, the vehicle 1 has an engine 5 and an automatic transmission 6 through which output torque from the engine 5 is multiplied and transmitted to a drive line including a propeller shaft 7 and a differential 8. The differential 8 drives both rear axles 9R and 9L at the same time but allows them to turn at different speeds when negotiating turns. The vehicle 1 has right and left front wheels 2R and 2L (driven wheels) and right and left rear wheels 3R and 3L (drive wheels). Each of the front and rear wheel 2R, 2L, 3R and 3L is provided with a brake disk 11 secured to the wheel and a caliper 12 witch produces clamping action on the rotating disk to brake the wheel. The vehicle 1 is further provided with a foot brake pedal 13 and an accelerator pedal 15. When foot pressure is applied to the hoot brake pedal 13, a brake master cylinder (not shown) produces braking pressure, thus causing the caliper 12 to apply braking force to the brake disk 11. On the other hand, when foot pressure is applied to the accelerator pedal 15, an engine throttle valve 14 is controlled through a linkage to open, introducing air into the engine 5.

Figure 10:
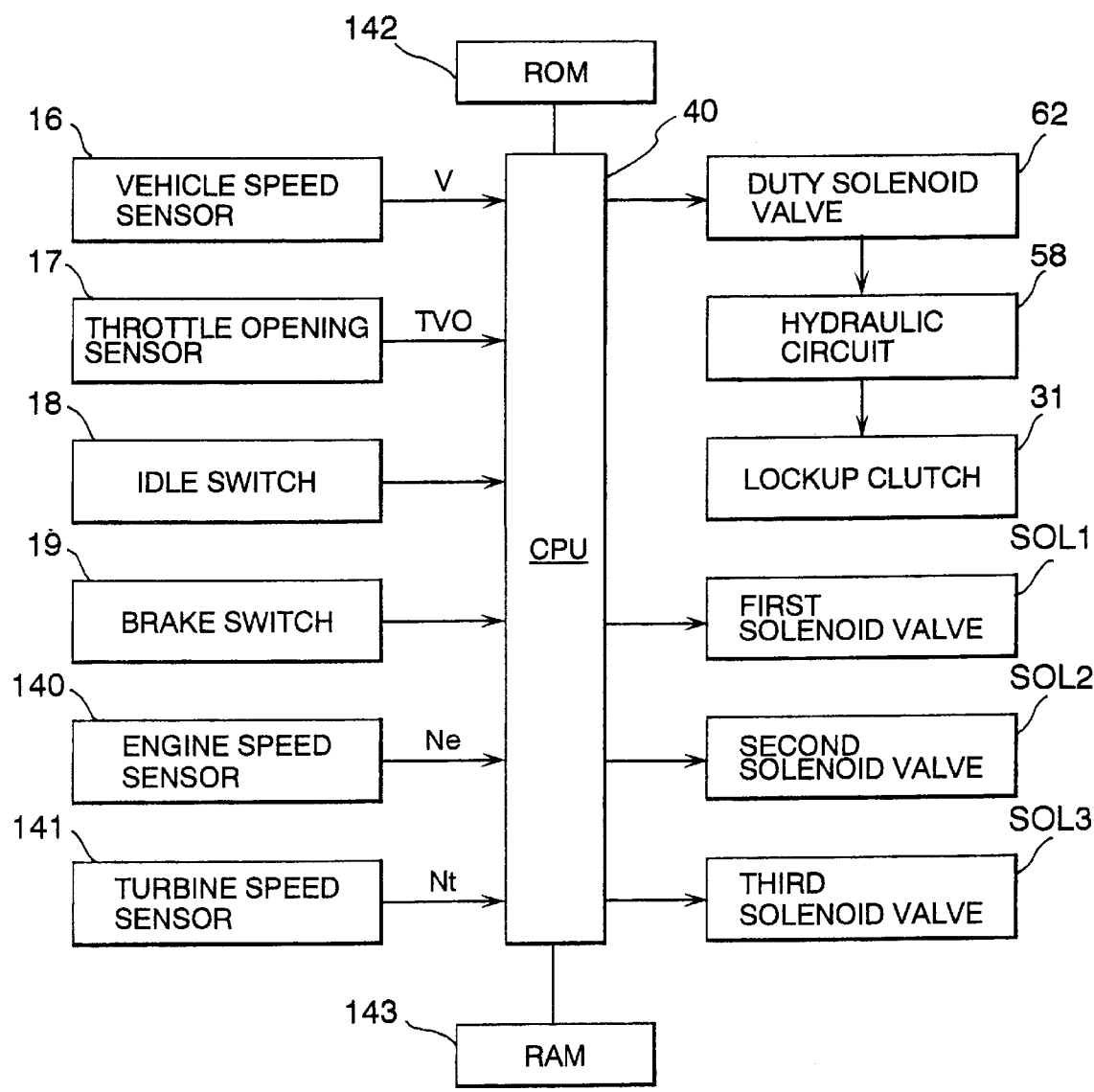
FIG. 10 is a block diagram showing hydraulic control system for the torque converter.

A transmission control unit (CPU) 40 comprising a microcomputer receives various sensors and switches including at least a vehicle speed sensor 16 to detect the speed of vehicle V, a throttle position or opening sensor 17 to detect of the opening of throttle TVO, an idle switch (IDSW) 18 and a brake switch (BRSW) 19 and provides a gear shift command signal to a gear shift unit 20 installed to the automatic transmission 6. The engine throttle valve 18 turns on the idle switch (IDSW) 17 while remaining closed to provide an idle signal. The foot brake pedal 13 turns on the brake switch (BRSW) 19 when stepped on to provide a brake signal. These sensors and switches are known in various types and may take any well known types, respectively. The transmission control unit 40 includes a read only memory (ROM) and a random access memory (RAM) as shown in FIG. 10. The ROM stores various control programs, and the RAM stork various data and control maps including a gear shift and lockup control map Ml shown in FIG. 2.

Figure 3:
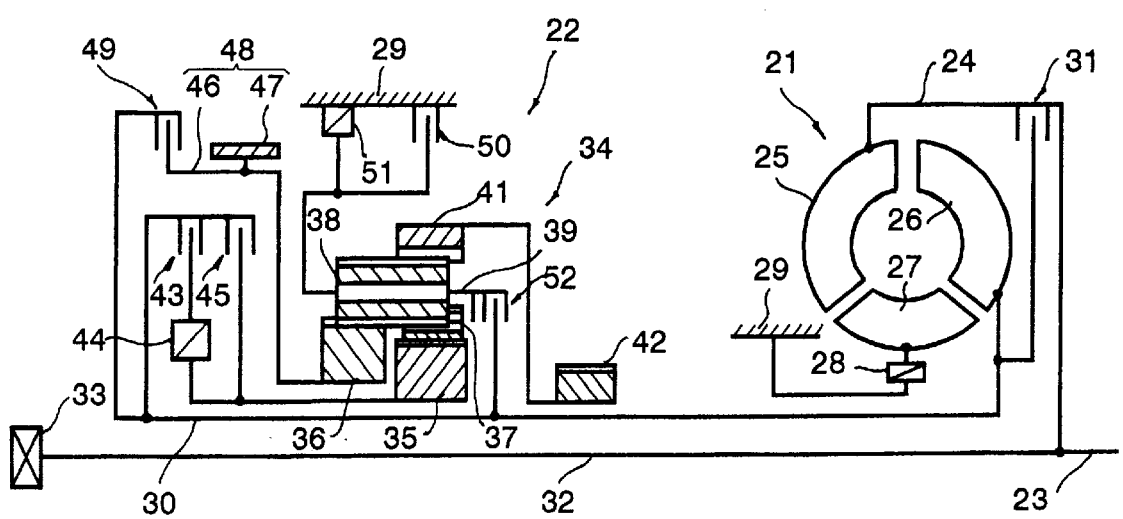
FIG. 3 is a skeleton diagram showing an automatic transmission.

FIG. 3 shows the automatic transmission 6 which comprises a torque converter 21, which is one of fluid coupling apparatuses, and a multi-step transmission gear mechanism 22 as a gear shift means for changing its driving force transmission path. The torque converter 21 comprises a pump (driver) 25 enclosed in and secured to a converter housing 24 and fastened to an engine output shaft 23 and a turbine 26 (driven) fastened to a hollow turbine shaft 30. These pump and turbine 25 and 26 are placed face to face with a slight clearance between them. The torque converter 21 further comprises one or more stators 26 inserted between the pump and turbine 25 and 26 and secured to the converter housing 24 through a one-way clutch 28. The stator 27 intercepts the oil thrown off by the turbine and redirect the path of this oil so it will enter the pump smoothly. The torque converter 21 can and does multiply engine torque as well as being able to transmit all available engine torque. The torque converter 21 is equipped with a lockup clutch 31. The lockup clutch 31 locks the pump and turbine 25 and 26 together with or without some slippage action between the pump and turbine 25 and 26 according to driving conditions when actuated. The automatic transmission 6 is provided with an oil pump 33 is driven by an engine shaft extension 32 passing through the hollow turbine shaft 30.

The transmission gear mechanism 22 includes a planetary gear unit 34. This planetary gear unit 34 comprises small and large sun gears 35 and 36 short and long pinion gears 37 and 38, a pinion carrier 39 and a ring gear 41, The small sun gear 35 and the large sun gear 36, which is placed on the rear side with respect to the small sun gear 35, are mounted for rotation on the turbine shaft 30. A plurality of the short pinion gears 37 (only one of which is shown in FIG. 3) is meshed with the small sun gear 35. The long pinion gear 38 is meshed with the short pinion gear 37 at its front end and with the large sun gear 36 at its rear end is also meshed with the ring gear 41. These short and long pinion gears 37 and 38 are supported for rotation by the pinion carrier 38. The ring gear 41 is fastened to a transmission output gear 42.

The planetary gear unit 34 cooperates with a plurality of friction coupling elements, such as clutches, to provide different power transmission paths, i.e. gear ratios or gears, and ranges. Specifically, a forward clutch 43 and a first one-way clutch 44 are arranged in series between the turbine shaft 30 and the small sun gear 35. A coast clutch 45 is arranged in parallel with respect to these forward clutch 43 and first one-way clutch 44. A second and fourth (2-4) brake 48, arranged radially outside the coast clutch 45, comprises a brake drum 46 coupled to the large sun gear 36 and a brake band 47 surrounding the brake drum 46. A reverse clutch 49, arranged axially behind or the rear side of the 2-4 brake 48, connects and disconnects transmission of engine torque between the turbine shaft 30 and the brake drum 46 or the large sun gear 36. Further, there are a low and reverse (low-reverse) brake 50 and a second one-way clutch 51 arranged in parallel with each other between the pinion carrier 39 and a transmission housing 29, and a third and fourth (3-4) clutch 52 arranged between the pinion carrier 39 and the turbine shaft 30.

The transmission gear mechanism 22 thus constructed changes the power transmission path of the planetary gear unit 34 by actuating these clutches 43, 45, 49 and 52 and brakes 48 and 50 in various patterns such as shown in FIG. 5 to provide four forward gears and one reverse gear. While the vehicle is traveling, various appropriate gears are automatically established according to driving conditions and selected ranges of the automatic transmission 5.

Figure 4:
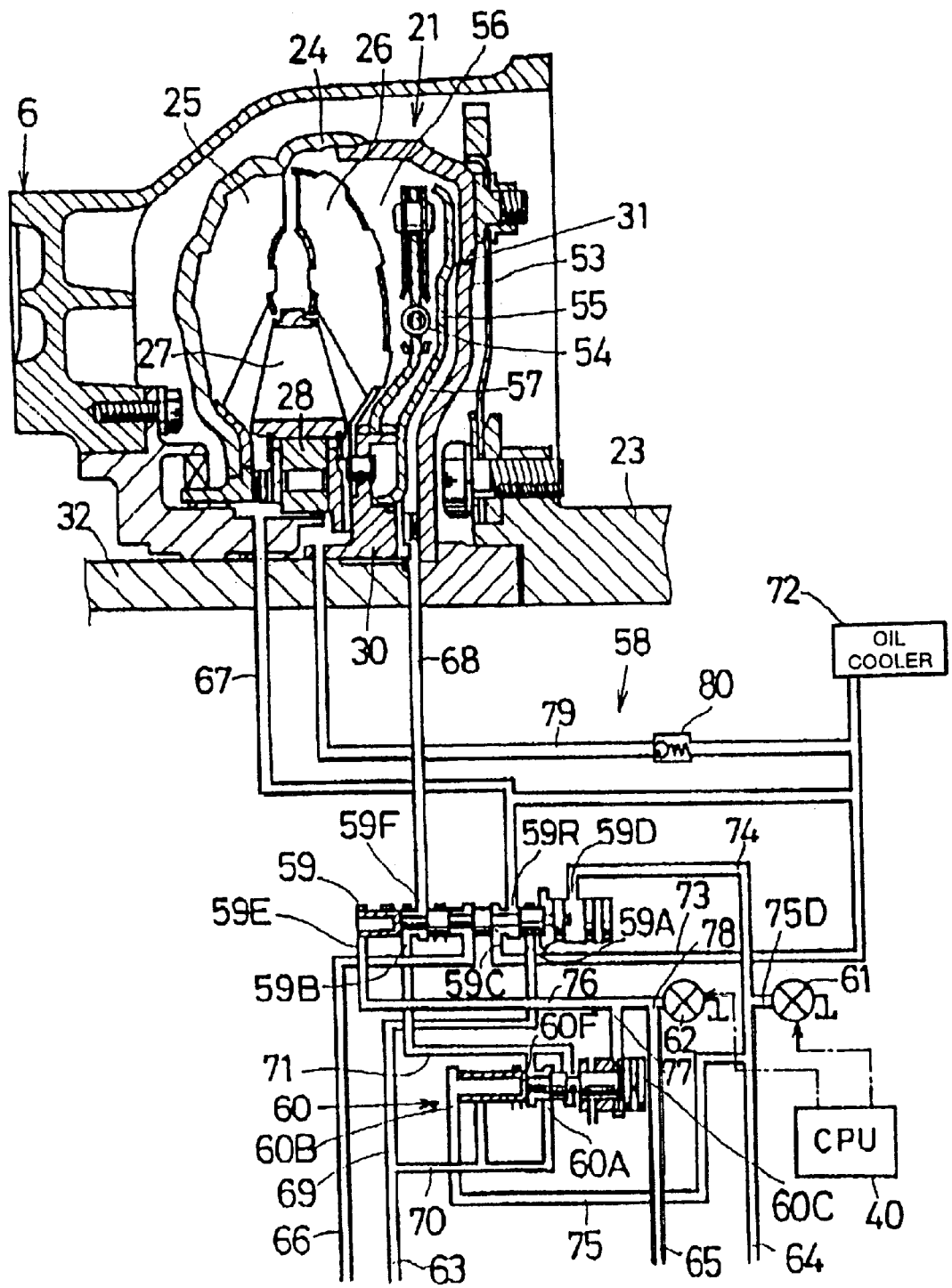
FIG. 4 is a hydraulic circuit related to a lockup clutch.

FIG. 4 showing the lockup clutch 31 and its hydraulic control circuit 58. The lockup clutch 31, which is incorporated in the torque converter 21, comprises a torsion damper 53 placed between the turbine 26 and a converter front cover 53 fastened to the turbine shaft 30 and fixedly supported by the turbine shaft 30, a damper piston 54 and a friction disk (not shown) secured to the converter cover 53 in a position opposite to the damper piston 55. This damper piston 55 divides a space formed between the converter 21 the converter housing 24 and converter cover 53 into a rear pressure chamber 56 adjacent to the turbine 26 and a front pressure chamber 57 adjacent to the converter cover 53. The damper piston 55 is forced against the friction disk to engage the lockup clutch 31 when hydraulic pressure is introduced into the rear pressure chamber 56 and is moved apart from the friction disk to disengage the lockup clutch 31 when hydraulic pressure is introduced into the front pressure chamber 57. Accordingly, the damper piston 55 is friction-engaged with the friction disk with engaging force corresponding to a difference between hydraulic pressure in these rear and front pressure chambers 56 and 57 or is released from the friction disk. Specifically, the lockup clutch 31 takes three operation modes, namely a disengaged or converter mode in which the lockup clutch 31 is completely disengaged to permit the torque converter to multiply engine torque as well as being able to transmit all available engine torque through the working oil, an engaged mode in which the lockup clutch 31 is completely engaged to lock the pump and turbine 25 and 26 of the torque converter 21 together so as to transmit engine output directly to the transmission gear mechanism 22 from the engine 5, and a half-engaged or slip mode in which the lockup clutch 31 brings the damper piston 55 into engagement with the friction disk but allows some slippage between them, according to the pressure difference between the rear and front pressure chambers 56 and 57. Changing the lockup clutch 31 among the three operation modes and controlling slippage of the lockup clutch 31 in the slip mode is governed by the hydraulic control circuit 58.

The hydraulic control circuit 58 includes various valves and a control unit (CPU) 40 for controlling the valves. Specifically, a shift valve 59 changes the path of hydraulic pressure supply to the lockup clutch 31. A lockup control valve 60 controls or regulates the hydraulic pressure supplied to the front pressure chamber 57 of the lockup clutch 31 through the shift valve 59 to engage the lockup clutch 31. A shut-off solenoid valve 61 connects and disconnects supply of first pilot hydraulic pressure to the shift valve and lockup control valve 59 and 60. A duty solenoid valve 62 controls second pilot hydraulic pressure according to duty ratios at which the duty solenoid valve 62 operates. These two solenoid valves 61 and 62 are controlled by the control unit (CPU) 40. The hydraulic control circuit 58 is supplied with line pressure provided by a regulator valve 82 (see FIG. 8) through a pressure line 63. The first and second pilot hydraulic pressure are introduced into the hydraulic control circuit 58 through first and second pilot pressure lines 64 and 65, respectively. Further, constant hydraulic pressure is introduced into the hydraulic control circuit 58 through a pressure line 66 leading to the shift valve 59. The shift valve 59 at one of its pressure outlet ports 59R is communicated with the rear pressure chamber 56 of the lockup clutch 31 through a pressure line 67, and the shift valve 59 at another pressure outlet port 59F is communicated with the front pressure chamber 57 of the lockup clutch 31 through a pressure line 68.

The pressure line 63 leading to the lockup control valve 60 from the regulator valve 82 (see FIGS. 6 and 7) branches off into two pressure lines, one pressure line 69 leading to an pressure inlet port 59A of the shift valve 59, and another pressure line 70 leading to an pressure inlet port 60A of the lockup control valve 60. The lockup control valve 60 at one of its outlet ports 60F and the shift valve 59 at one of its inlet ports 59B are in communication with each other through a pressure line 71. The shift valve 59 at another one of its inlet ports 59C is connected to a pressure line 73 leading to an oil cooler 72. The first pilot pressure line 64 branches off into two pressure lines, namely a pressure line 74 leading to a pressure inlet port 59D of the shift valve 59 and a pressure line leading to a pressure inlet port 60B of the lockup control valve 60. A drain pressure line 74D branching off from the pressure line 74 is provided with the solenoid valve 62. The drain pressure line 78 is closed while the duty solenoid valve 62 remains turned off and is open to drain pressure while the duty solenoid valve 62 remains turned on. The second pilot pressure line 65 branches off into two pressure lines, namely a pressure line 76 leading to a pressure inlet port 59E of the shift valve 59 and a pressure line 77 leading to a pressure inlet port 60C of the lockup control valve 60. A drain pressure line 78 branching off from the second pilot pressure line 65 is provided with the duty solenoid valve 62. The drain pressure line 78 is closed while the duty solenoid valve 62 remains turned off and is open to drain pressure while the duty solenoid valve 62 remains turned on. Further, the second pilot pressure is developed in the second pilot pressure line 65 according to duty ratios at which the duty solenoid valve 62 operates. The second pilot pressure becomes lower with an increase in the duty ratio. A pressure line 79 equipped with a check valve 80 leads to the oil cooler 72 from the torque converter 21 to transmit the working oil therebetween. The shift valve 59 shifts its two spools according to pilot pressure introduced through the first or second pilot pressure lines 64 and 65. One of the two spools brings the pressure outlet port 59R into communication with the pressure unlet port 59A or 59C. Another spool brings the pressure outlet port 59F into communication with the pressure unlet port 59B or a drain port. The lockup control valve 60 shifts its spool according to pilot pressure introduced through the first or second pilot pressure lines 64 and 65 to bring the pressure outlet port 60F into communication with the pressure inlet port 60A or the drain port.

Figure 2:
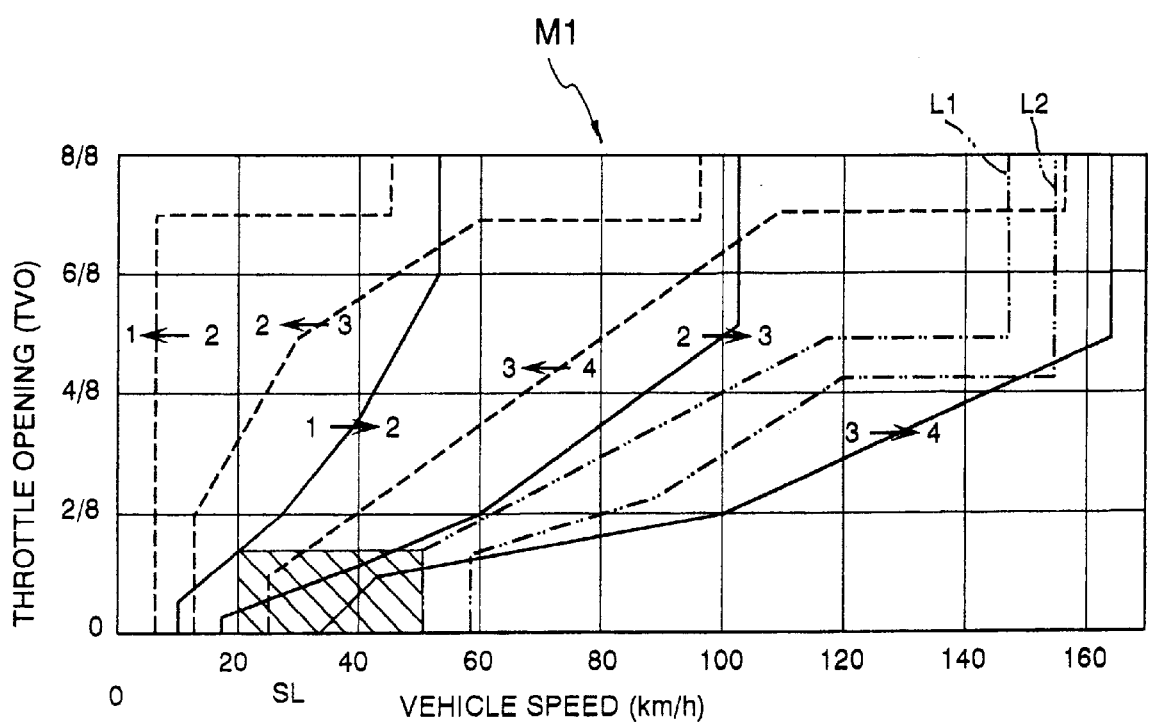
FIG. 2 is a diagram showing a scheduled shift control map.

The control unit (CPU) 40 changes the operation of the lockup clutch 31 among the three operation modes following the scheduled shift and lockup control map M1 shown in FIG. 2 according to driving conditions. The scheduled shift and lockup control map M1 defines various shift lines with respect to vehicle speed and throttle opening. The lockup clutch 31 is controlled to operate in the converter mode in a zone of driving conditions defined on an upper side of an imaginary shift line L1 and in the engagement mode in a zone of driving conditions defined on a lower side of an imaginary shift line L2. Further, the lockup clutch 31 is controlled to operate in the slip mode in a slippage zone of driving conditions shown as a shaded area (SL) in the map M1.

In the converter mode, the solenoid valve 61 is turned off and the duty solenoid valve 62 operates at a duty ratio of 0%, causing the shift valve 59 to place its spools in their left end positions as viewed in FIG. 4. As a result of which, the shift valve 59, on one hand, brings the pressure outlet port 59R connected to the pressure line 76 into communication with the pressure inlet port 59C connected to the pressure line 73 to release the locking pressure in the rear pressure chamber 56 of the lockup clutch 31 into the oil cooler 72 and, on the other hand, brings the pressure outlet port 59F connected to the pressure line 68 into communication with the pressure inlet port 59B connected to the lockup control valve 60 through the pressure line 71 to introduce the hydraulic pressure into the front pressure chamber 57 of the lockup clutch 31. In this way, the hydraulic pressure in the rear pressure chamber 56 becomes higher than that in the front pressure chamber 57, causing the lockup clutch 31 to disengage completely.

In the engagement mode, the solenoid valve 61 is turned on and the duty solenoid valve 62 operates at a duty ratio of 100%, causing the shift valve 59 to place its spools in their right end position as viewed in FIG. 4. As a result of which, the shift valve 59, on one hand, brings the pressure outlet port 59R connected to the pressure line 76 into communication with the pressure inlet port 59A connected to the pressure line 63 to introduce the locking pressure the rear pressure chamber 56 of the lockup clutch 31 through the pressure lines 69 and 67 and, on the other hand, brings the pressure outlet port 59F connected to the pressure line 68 into communication with the drain port to release the hydraulic pressure in the front pressure chamber 57 of the lockup clutch 31. In this way, the pressure difference between the rear and front pressure chambers 56 and 57 becomes approximately equal to the line pressure, causing the lockup clutch 31 to engage completely.

In the slip mode, while the solenoid valve 61 is turned on, the duty solenoid valve 62 operates at duty ratios greater than 20% according to a deviation of the difference between input and output speeds of rotation from the target difference, causing the shift valve 59 to place its spools in opposite end positions, respectively. As a result of which, the shift valve 59, on one hand, brings the pressure outlet port 59R connected to the pressure line 76 into communication with the pressure inlet port 59A connected to the pressure line 63 to introduce the locking pressure into the rear pressure chamber 56 of the lockup clutch 31 through the pressure lines 69 and 67 and, on the other hand, brings the pressure outlet port 59F connected to the pressure line 68 into communication with the pressure inlet port 59B to introduce the hydraulic pressure into the front pressure chamber 57 of the lockup clutch 31. In this way, the pressure difference between the rear and front pressure chambers 56 and 57, and hence the locking pressure of the lockup clutch 31, is controlled according to duty ratios to allow the lockup clutch 31 to produce slippage. In this slip mode, the locking pressure is feedback controlled according to a deviation of the difference between input and output speeds of rotation from the target speed difference.

Figure 6:
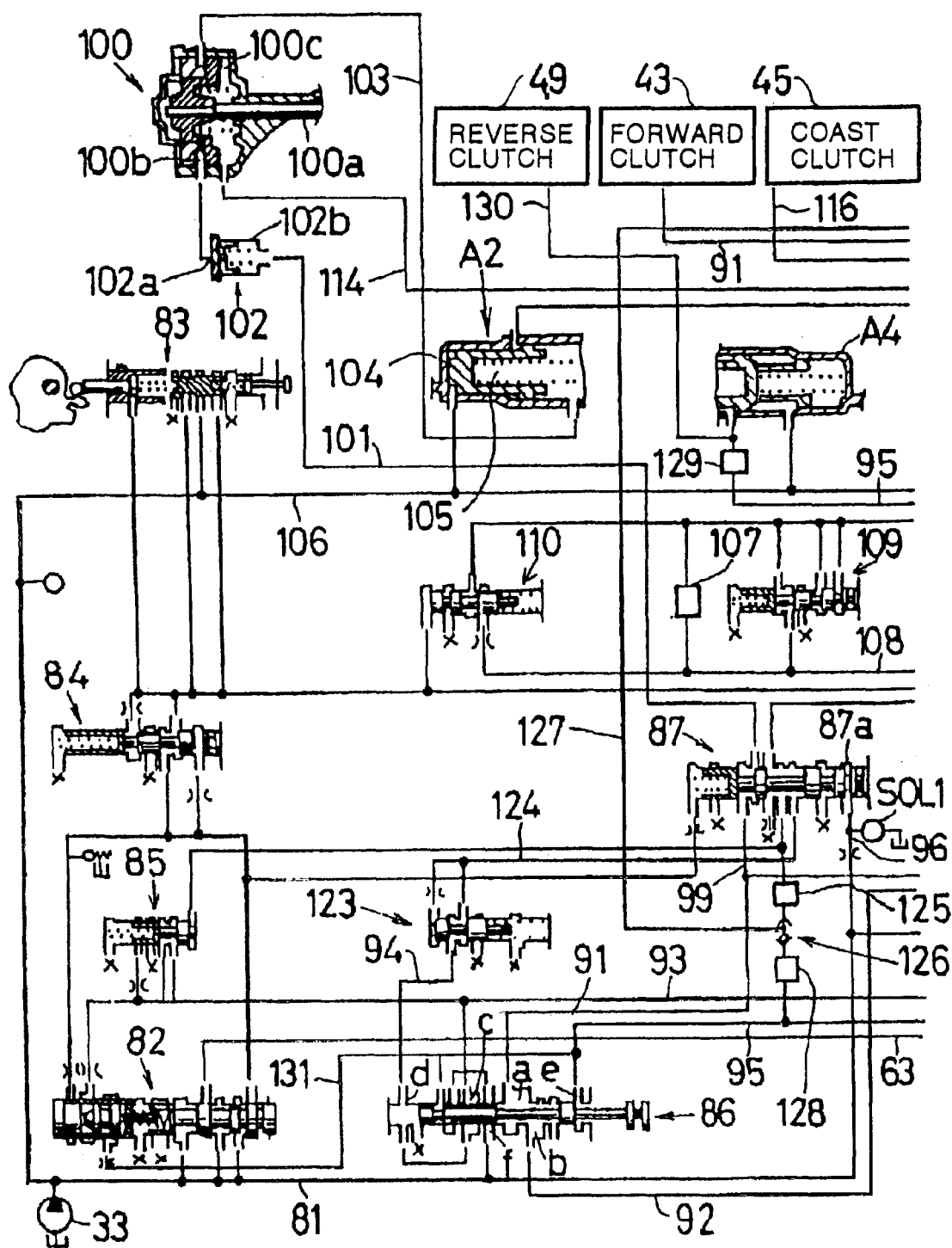
FIGS. 6 and 7 are a hydraulic control circuit relating to the automatic transmission including the lockup clutch.
Figure 7:
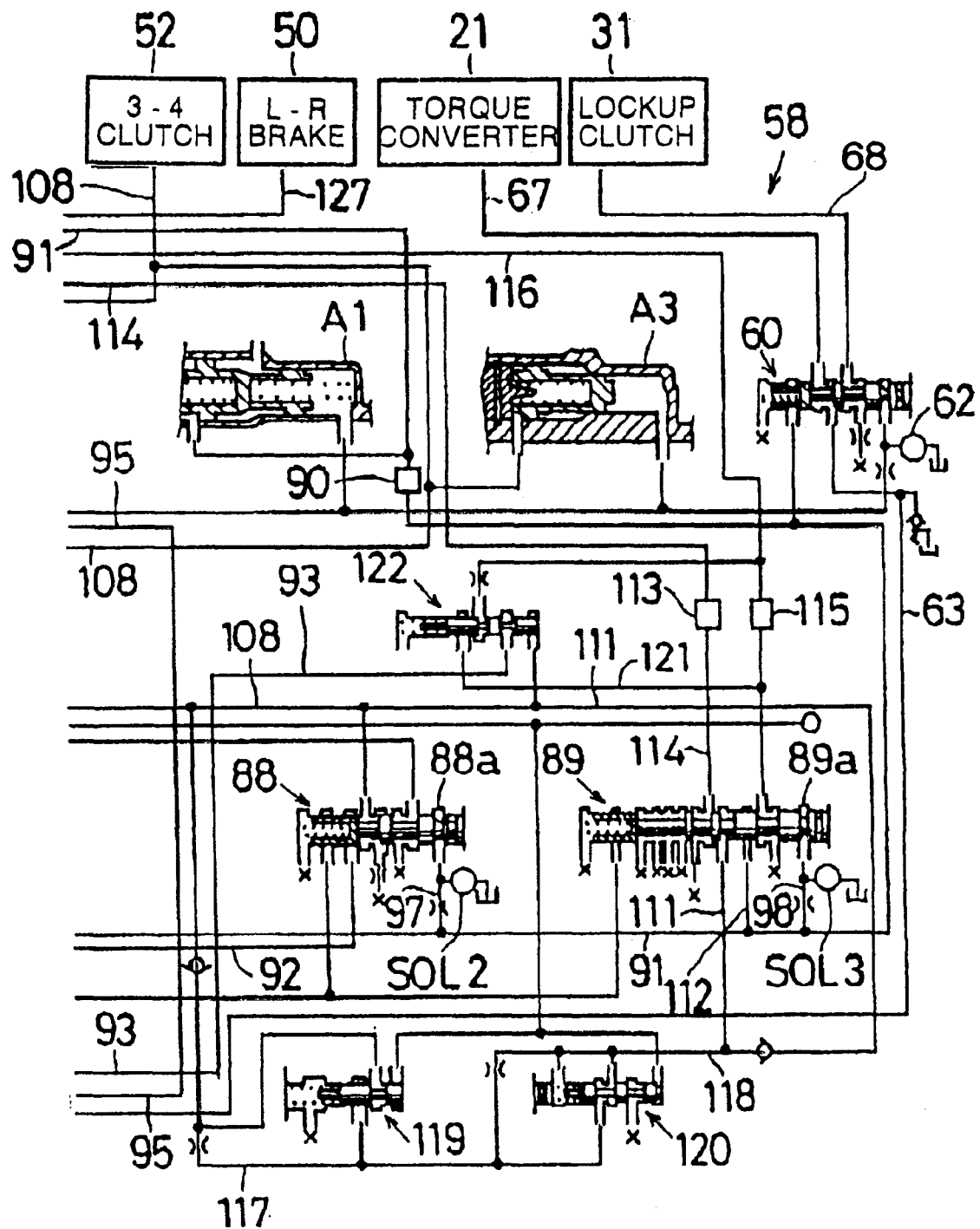

FIGS. 6 and 7 show a hydraulic control circuit for the friction coupling elements which includes the hydraulic control circuit 58 associated with the lockup clutch 31. In the hydraulic control circuit drain ports are indicated by a reference $\chi$.

Hydraulic pressure discharged into a main pressure line 81 by the oil pump 33 is regulated to a specified level of line pressure by means of a regulator valve 82. The hydraulic control circuit includes various valves. Specifically, a regulator valve 83 develops throttle pressure according to openings of the engine throttle valve 14. A regulator valve 84 modulates the throttle pressure. A regulator valve 85 boosts the line pressure to provide backup pressure in a second (S) range or in a low (L) range. A manual shift valve 86, which delivers the line pressure to either one of three pressure lines 91, 93 and 95 according to transmission ranges selected, has a pressure inlet port $f$ connected to the main pressure line 81 and five pressure outlet ports a–e connected to first to fifth output pressure lines 91–95, respectively. The manual shift valve 86 places its spool to bring the pressure inlet port $f$ into communication with either one of the pressure outlet ports according to manually selected ranges of the automatic transmission, i.e. the pressure outlet port a, b or c in the drive (D) range, the pressure outlet port e in the reverse (R) range. Shift valves 87, 88 and 89 are activated to cause a first-to-second (1-2) gear shift, a second-to-third (2-3) gear shift and a third-to-fourth (3-4) gear shift, respectively. Each shift valve 87, 88, 89 has a spring loaded spool forced to the right end position as viewed in the figures and a control pressure inlet port 87a, 88a, 89a at the right end which is connected to a control pressure line 96, 97, 98 branching off from the main pressure line 81. These control pressure lines 96, 97 and 98 are provided with solenoid valves SOL1, SOL2 and SOL3, respectively. Each solenoid valve SOL1, SOL2, SOL3 is turned off to introduce control pressure into the shift valve corresponding to the solenoid valve through the control pressure inlet port, forcing the spool to the left end position and turned on to drain the control pressure in the control pressure inlet port through a drain port $\chi$ to return the spool to the right end position. These solenoid valves SOL1, SOL2 and SOL3 are actuated in different patterns according to driving conditions including throttle opening TVO and vehicle speed V to create desired gears. The actuation patterns of the solenoid valves SOL1, SOL2 and SOL3 for various gears in the drive range are shown in FIG. 8 wherein a solenoid valve is turned on in a gear indicated by a circle and turned off in a gear indicated by a cross and a clutch is locked in a gear indicated by a circle and unlocked in a gear indicated by a cross. The first output pressure line 91, which is brought into communication with the main pressure line 81 in forward ranges including the drive (D), second (2) and low (L) ranges, leads via an orifice 90 to a forward clutch 43.

The first output pressure line 91 is accompanied by an accumulator A1 to absorb a chock occurring upon locking the forward clutch 43 when the automatic transmission is changed to the drive (D) range from the neutral (N) range. A pressure line 99 branches off from the first output pressure line 91 and leads to the 1-2 shift valve 87. The 1-2 shift valve 87 brings the pressure line 99 into communication with a pressure line 101 leading to a first or servo apply pressure chamber 100b of a servo control device 100 cooperating with a 2-4 brake 48. Hydraulic pressure is introduced into the servo apply pressure chamber 100b when the solenoid valve SOL1 is turned on in any one of the forward ranges, more specifically in second, third or fourth gear in the drive (D) range, in second or third gear in the second (S) range or in second gear in the low (L) range. On the contrary, no hydraulic pressure is introduced into the servo apply pressure chamber 100b while the solenoid valve SOL1 remains turned off.

The servo control device 100 for actuating the 2-4 brake 48 has a piston 100a which provides the servo apply pressure chamber 100b and a second or servo release pressure chamber 100c on opposite sides thereof and cooperates with the 2-4 brake 48, and a return spring installed in the servo release pressure chamber 100c for forcing the piston 100a toward the servo apply pressure chamber 100b. The piston 100a has a piston head having a surface area at one side facing the servo release pressure chamber 100c greater than a surface area at the opposite side facing the servo apply pressure chamber 100b. Because of the difference between the surface areas of the piston head, the servo control device 100 forces the piston 100a to the left end position against the return spring under the presence of hydraulic pressure (servo release pressure) in the servo release pressure chamber 100c in spite of presence or absence of hydraulic pressure (servo apply pressure) in the servo apply pressure chamber 100b, releasing or unlocking the 2-4 brake 48. When introducing hydraulic pressure into the servo apply pressure chamber 100b and withdrawing hydraulic pressure from the servo release pressure chamber 100c, the servo control device 100 permits the piston 100a to return to the right end position, locking or applying the 2-4 brake 48.

The pressure line 101 leading to the servo apply pressure chamber 100b of the servo control device 100 is provided with a one-way orifice 102 comprising a restrictor 102a whose opening is smaller in cross-sectional area than the pressure line 101 and a return spring 102b forcing the restrictor 102a toward downstream or in a direction to the servo control device 100. The one-way orifice 102 restricts an oil flow directed to the servo apply pressure chamber 100b of the servo control device 100 and, however, removes restriction on an oil flow from the servo apply pressure chamber 100b due to contraction of the return spring 102b caused by the oil flow. The return spring 100b has a relatively strong expansion force such as to return the restrictor 102b against hydraulic pressure exerting on the restrictor 102b when the hydraulic pressure is lower than a specified level corresponding to a specified small opening TVO of the engine throttle valve 14 due to a fall of the line pressure which is caused following a reduction in engine speed of rotation. The orifice 102 with the return spring 102b thus designed restricts the oil flow withdrawn from the servo apply pressure chamber 100b when the hydraulic pressure is lower than a specified level. An accumulator A2 is installed to a pressure line 103 downstream from the servo control device 100 which serves as a damper for restraining a sharp boost in hydraulic pressure introduced into the servo apply pressure chamber 100b of the servo control device 100. This accumulator A2 comprises a piston 104, a pressure chamber 105 into which hydraulic pressure is introduced to force the piston 104 to the left as viewed in the figure, and a bias spring 104a placed in the pressure chamber 105. The piston 104 is always forced by back pressure introduced through a pressure line 106. Through movement of the piston 104 biased by the bias spring which is caused in response to a gradual increase in difference between hydraulic pressure introduced into the accumulator A2 on both sides of the piston 104 through the pressure lines 104 and 106 accompanies gradual movement of the piston 100a of the servo control device 100, causing gentle application of the 2-4 brake 48.

The second output pressure line 92, which is brought into communication with the main pressure line 81 in the drive (D) range or in the second (S) range, leads to the 2-3 shift valve 88. While the solenoid valve SOL2 remains turned off, the 2-3 shift valve 88 forces its spool to the left end position to bring the pressure line 92 into communication with a pressure line 108 which leads to the 3-4 clutch 52, in more specifically to an actuator (not shown) for the 3-4 clutch 52, via a one-way orifice 107. Accordingly, when the solenoid valve SOL2 is turned off in the drive (D) range or the second (S) range, namely in the third or fourth gear in the drive (D) range or in the third gear in the second (S) range, the 3-4 clutch 52 is locked. The pressure line 108 is provided with a bypass valve 109 and a 2-3 timing valve 110 each of which is arranged in parallel to the one-way orifice 107. The 2-3 timing valve 110 regulates a locking timing of the 3-4 clutch 52. Further, the pressure line 108 is accompanied by an accumulator A3 to absorb a shock upon locking the 3-4 clutch 52.

A pressure lines 111 and 112 branching off from the pressure line 108 and the first output pressure line 91, respectively, lead to the 3-4 shift valve 89. While the solenoid valve SOL3 remains turned off, the 3-4 shift valve 89 forces its spool to the left end position to bring the pressure lines 111 and 112 into communication with a pressure line 114 leading to the servo release pressure chamber 100c of the servo control device 100 and a pressure line 116 leading to the coast clutch 45, respectively. These pressure lines 114 and 116 are provided with one-way orifices 113 and 115, respectively. While both solenoid valves SOL2 and SOL3 remain turned off in the drive (D) range or the second (S) range, in more specifically in the third gear in the drive (D) range or the second (S) range, hydraulic pressure is introduced into the servo release pressure chamber 100c of the servo control device 100 as servo release pressure through the pressure line 114, releasing the 2-4 brake. Further, while the solenoid valve SOL3 remains turned off in the drive (D) range, the second (S) range or the low (L) range, in more specifically in the third gear in the drive (D) range or the second gear second (S) range or in the second gear in the low (L) range, or further in the second or third gear in the second (S) range while the hold switch is operated or in the first or second gear in the low (L) range while the hold switch is operated, hydraulic pressure is introduced into the coast clutch 45 through the pressure line 116, locking the coast clutch 45.

Between the pressure lines 108 and 111 branching off from the pressure line 108 there are provided a 3-2 timing valve 119 for regulating a timing of withdrawing hydraulic pressure for the 3-4 clutch and a timing of withdrawing hydraulic pressure from the servo release pressure chamber 100c of the servo control device 100 and a 3-2 capacity valve 120. These timing valve 119 and capacity valve 120 are installed to a pressure line 117 branching off from the pressure line 111 and a pressure line branching off from the pressure line 118, respectively. There is a pressure line 121 branching off from the pressure line 116 and bypassing the one-way orifice 115. A 3-4 capacity valve 122 is installed to the pressure line 121. The 3-4 capacity valve 122 opens the pressure line 121 to regulate a timing of withdrawing hydraulic pressure from the coast clutch 46 when hydraulic pressure is developed in the pressure line 108 or while the third output pressure line 93 remains communicated with the main pressure line 81 while the manual shift valve 86 is in the second (S) range or the low (L) range.

The fourth output pressure line 94 is brought into communication with the main pressure line 81 while the manual shift valve 86 is in the low (L) range. This fourth pressure line 94 is brought into communication with a pressure line 124 leading to the 1-2 shift valve 87 by means of a reduce valve 123. The pressure line 124 is brought into communication with a pressure line 127 leading to the low-reverse brake 50 via a one-way orifice 125 and a shuttle valve 126 when the first solenoid valve SOL1 is turned off to force its spool to the left end position. In this instance, while the first solenoid valve SOL1 remains turned off in the low (L) range, i.e. in the first gear in the low (L) range, the low-reverse brake 50 is locked or applied.

The fifth output pressure line 95, which is brought into communication with the main pressure line 81, branches off into to the pressure line 127 leading to the low-reverse brake 50 via a one-way orifice 128 and the shuttle valve 126 and the pressure line 130 leading to the reverse clutch 49 via a one-way orifice 129. Accordingly, these low-reverse brake 50 and reverse clutch 49 are always locked or applied in the reverse (R) range. The pressure line 130 is accompanied by an accumulator A4 to absorb a chock occurring upon locking the reverse clutch 49 when the automatic transmission is changed to the reverse (R) range from the neutral (N) range. A pressure line 131 branching off from the fifth output pressure line 95 leads to a pressure inlet port of the regulator valve 82 for increasing line pressure in the reverse (R) range.

FIG. 9 shows actuation patterns which the first to third solenoid valves SOL1–SOL3 theoretically take. As seen in FIG. 9, the third gear can be provided by actuating the first to third solenoid valves SOL1–SOL3 in three different patters (patterns No. 1, No. 2, and No. 3). This is because the 2-4 brake 48 is released due to the difference the surface areas of the piston head of the servo control device 100 facing to the pressure chambers 100b and 100c of the servo control device 100 whenever hydraulic pressure is introduced into the servo release pressure chamber 100c of the servo control device 100 regardless of introduction of hydraulic pressure into the servo apply pressure chamber 100b. In the actuation pattern No. 3 for the third gear where the servo control device 100 receives hydraulic pressure in the servo release pressure chamber 100c only, the solenoid valves SOL1–SOL3 are all turned off.

FIG. 10 shows control circuit in block diagram. The control unit (CPU) 40 receives signals from various switches 18 and 19 and sensors 16, 17, 140 and 141. The engine speed sensor 140 is incorporated in a distributor (not shown) to detect the engine speed of rotation Ne. The turbine speed sensor 141 is incorporated in the torque converter 21 to detect the turbine speed of rotation Nt. Each of these switches and sensors is known in various types and may take any well known type. The control unit (CPU) 40 incorporates the read only memory (ROM) 142 which stores a programmed sequence routine for controlling actuation of the solenoid valves SOL1–SOL3 based on the signals and a random access memory (RAM) 143 storing various data and control maps including the scheduled shift and lockup control map M1. This control unit (CPU) 40 performs downslope gear shift control of the transmission gear mechanism 22 to a gear, for example the third gear, in which engine brake is applied more effectively while the vehicle is traveling on a downslope steeper than a specified slope and lockup control in which engagement of the lockup clutch 31 is relaxed or released after the downslope gear shift, or otherwise the lockup clutch 31 is disengaged in the third gear to which the downslope gear shift is caused from the fourth gear.

Figure 11:
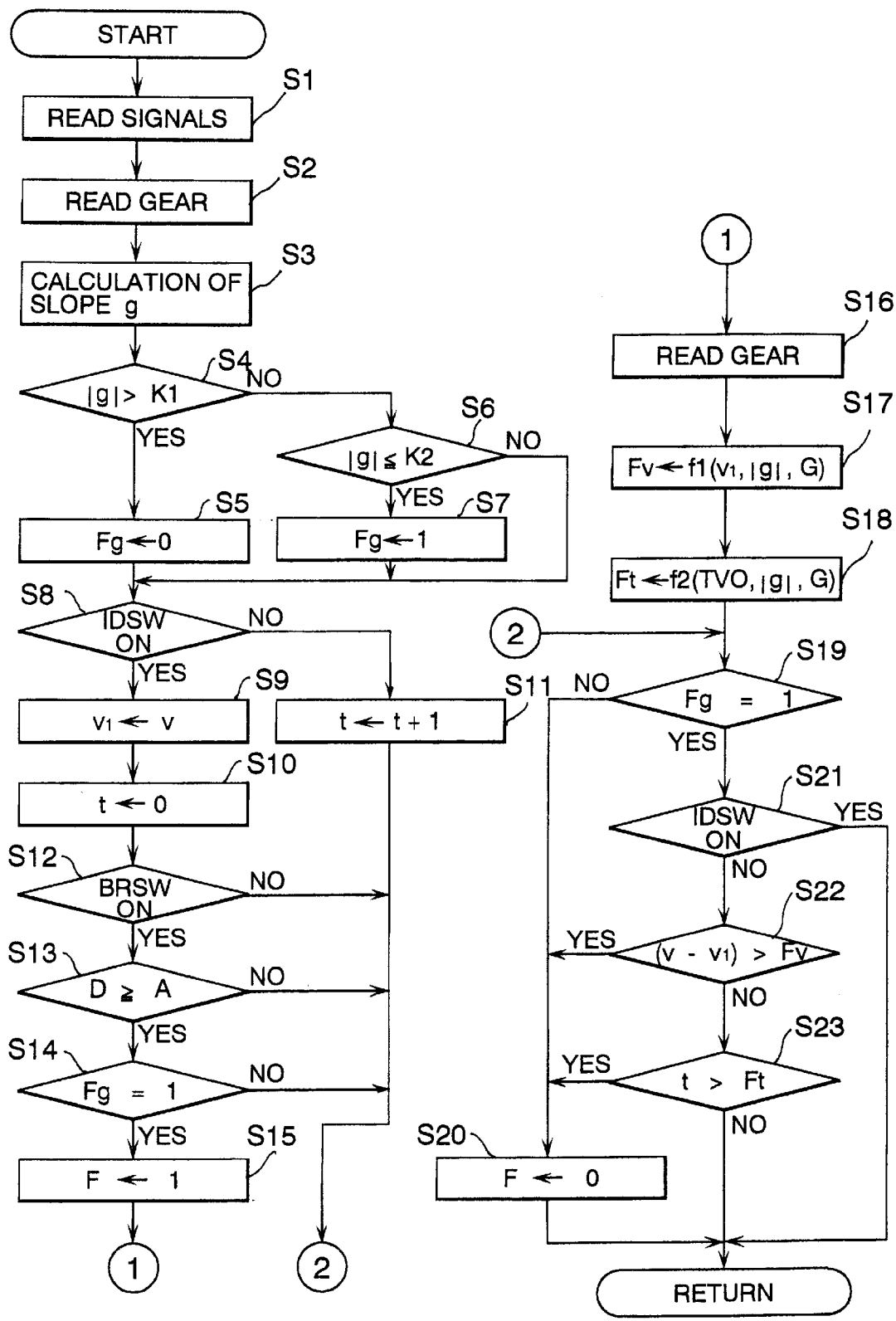
FIG. 11 is a flow chart illustrating the downslope decision sequence routine.
Figure 12:
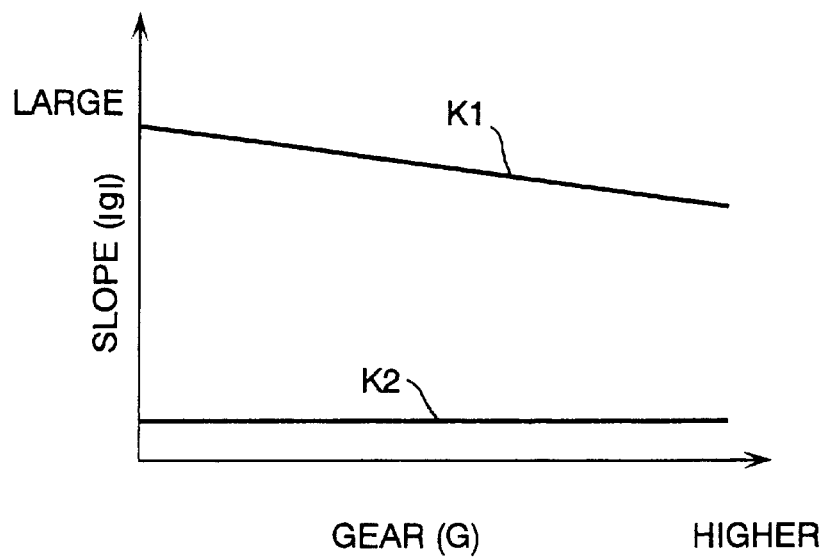
FIG. 12 is a diagram showing specified slope relative to gear.
Figure 13:
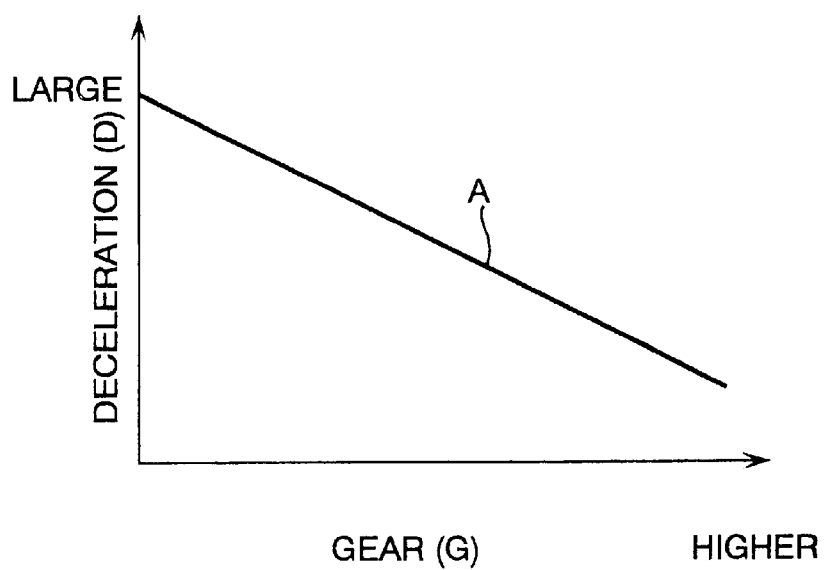
FIG. 13 is a diagram showing specified deceleration relative to gear.

FIG. 11 is a flow chart illustrating the sequence routine of downslope judgement. When the flow chart logic commences, after reading various signals from the sensors 16, 17, 140 and 141 and switches 18 and 19 at step S1, a shift signal indicating a gear G is read at step S2. The gear G is determined based on driving conditions including vehicle speed V and throttle opening TVO in the scheduled shift and lockup control map M1 shown in FIG. 2. Subsequently, a slope g of the road on which the vehicle is traveling is calculated based on turbine torque which is obtained based on the vehicle speed V, throttle opening TVO and turbine speed Nt, the gear G and the vehicle speed V at step S3. The calculation of slope g is not be described in detail herein since it can easily be arrived at by those skilled in the art. The value of slope g is zero (0) for a level road or minus for a downslope. Steps S4 through S17 are taken to judge whether the road is level or downhill. Specifically, a judgement is made at step S4 as to whether the absolute value of slop g is greater than a specified first slop K1 set forth for critical downslopes. As shown in FIG. 12, the specified first slope K1 is variable and takes a smaller value as the gear G becomes higher.

Accordingly, when the vehicle is traveling with a higher gear, the answer to the judgement is apt to be affirmative. Whenever the absolute value of slop g is greater than the specified first slop K1, a slope flag Fg is up or set to a state of "1" at step S5. However, when the answer to the judgement is negative, this indicates that the downslope on which the vehicle is traveling is not steeper than the specified first slope K1, then, at step S6, the absolute value of slop g is compared with a specified second slop K2 set forth for level roads which is smaller than the specified first value K1 but greater than zero (0) and invariable regardless of gears as shown in FIG. 12. When the absolute value of slop g is equal to or less than the specified second slop K2, then the slope flag Fg is down or reset to a state of "1" at step S7. However, when the absolute value of slop g greater than the specified second slop K2, this indicates that the road on which the vehicle is traveling is neither level nor steeper than the critical downslope specified by the first slope K1, then the slope flag Fg remains unchanged. After setting or resetting the slope flag Fg either to the state of "1" at step S5 or to the state of "0" at step S7 or when the absolute value of slop g greater than the specified second slop K2, a judgement is made at step S8 as to whether the idle switch (IDSW) 18 remains turned on. When the answer to the judgement is affirmative, this indicates that the accelerator pedal 15 remains released, then the vehicle speed V is taken and stored as an on-idie vehicle speed Vi at step S9. This on-idle vehicle speed Vi is replaced with the vehicle speed V while the idle switch (IDSW) 18 remains turned on, in other words, while the accelerator pedal 15 remains released. After replacement of the on-idle vehicle speed Vi at step S9, a timer clears its count t or resets its count t to zero (0) at step S10. On the other hand, while the idle switch (IDSW) 18 remains turned off, this indicates that the accelerator pedal 15 remains stepped on, then the timer changes the count t by an increment of 1 (one) at step S11. As apparent, the timer monitors the duration of time for which the accelerator pedal 15 remains stepped on.

Figure 14:
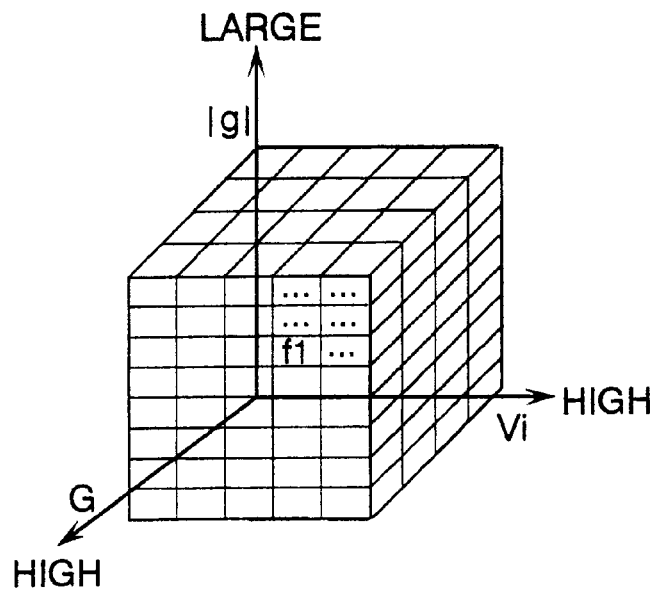
FIG. 14 is a conceptualized diagram showing specified vehicle speed.
Figure 15:
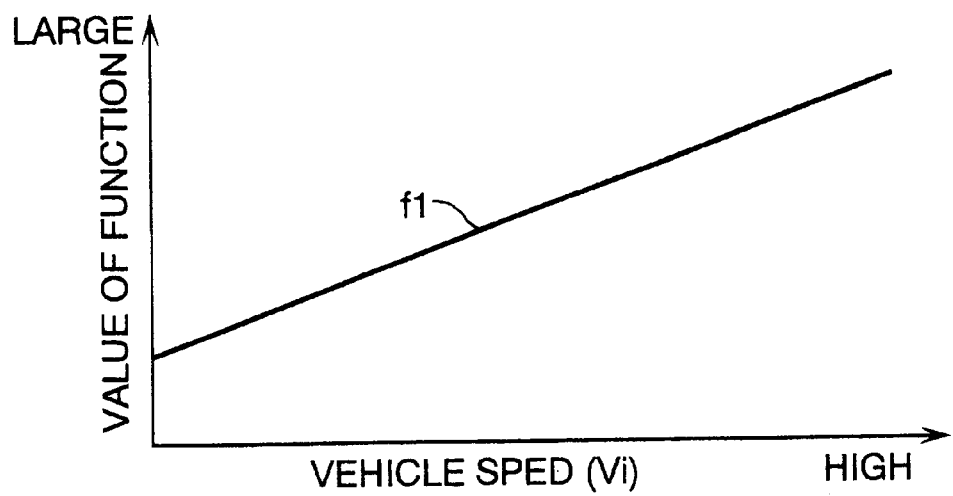
FIG. 15 is a diagram showing functional value relative to vehicle speed.
Figure 16:
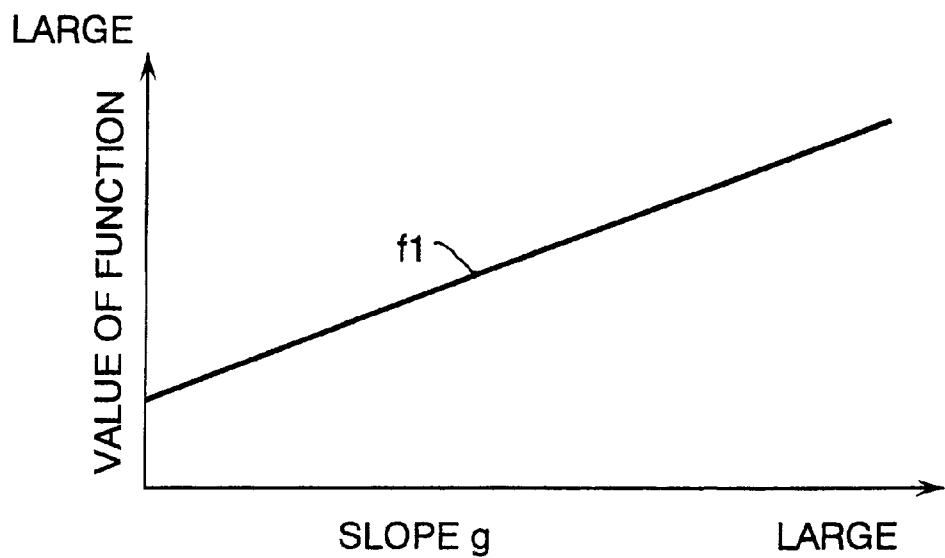
FIG. 16 is a diagram showing functional value relative to slope.
Figure 17:
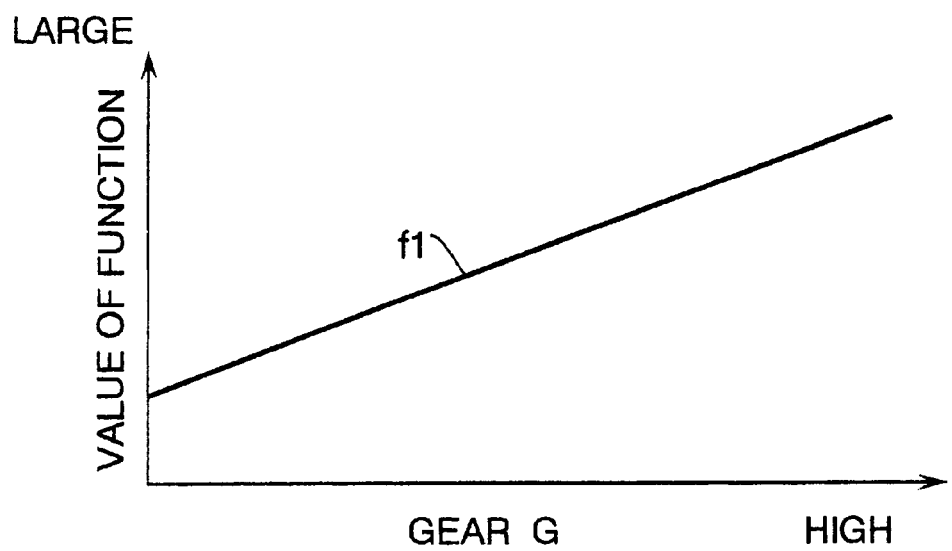
FIG. 17 is a diagram showing functional value relative to gear.
Figure 18:
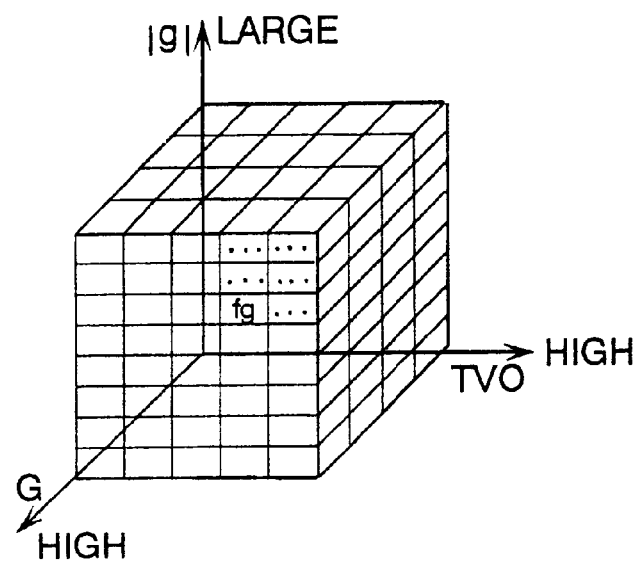
FIG. 18 is a conceptualized diagram showing specified time.
Figure 19:
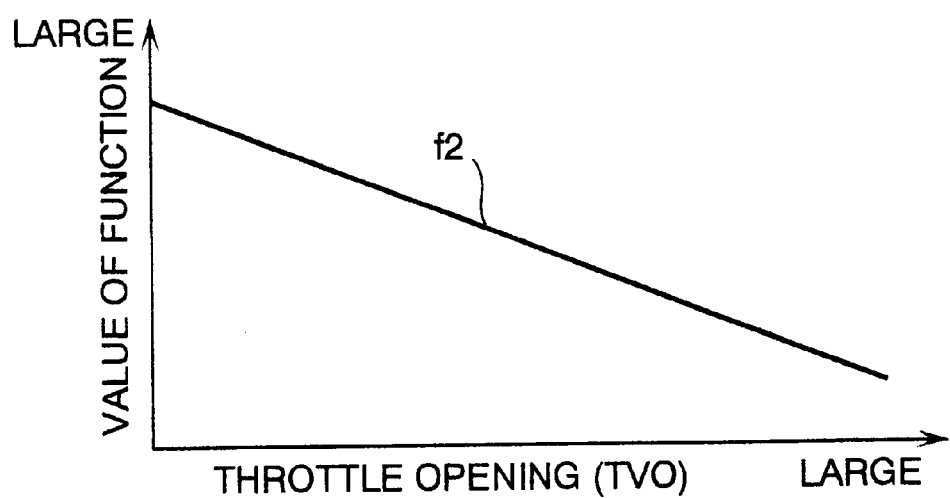
FIG. 19 is a diagram showing functional value relative to throttle opening.
Figure 20:
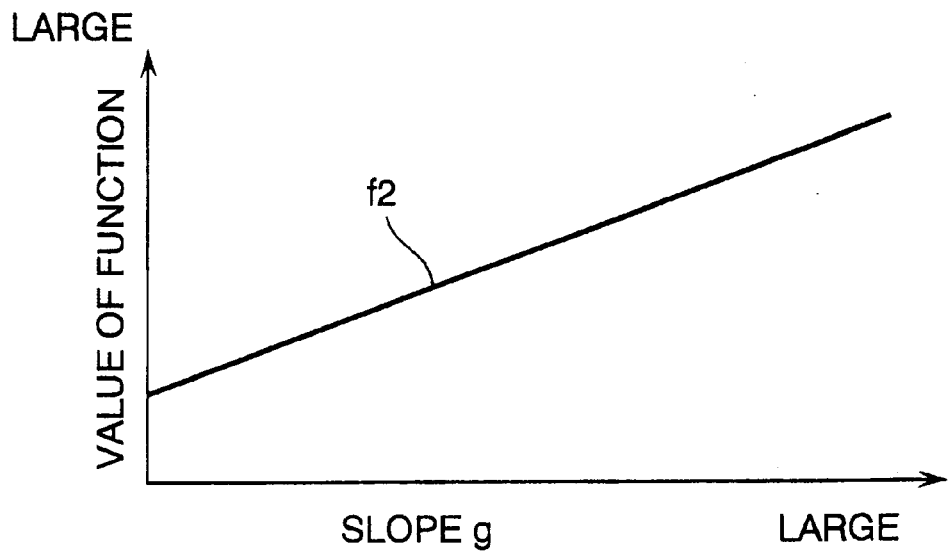
FIG. 20 is a diagram showing functional value relative to slope.
Figure 21:
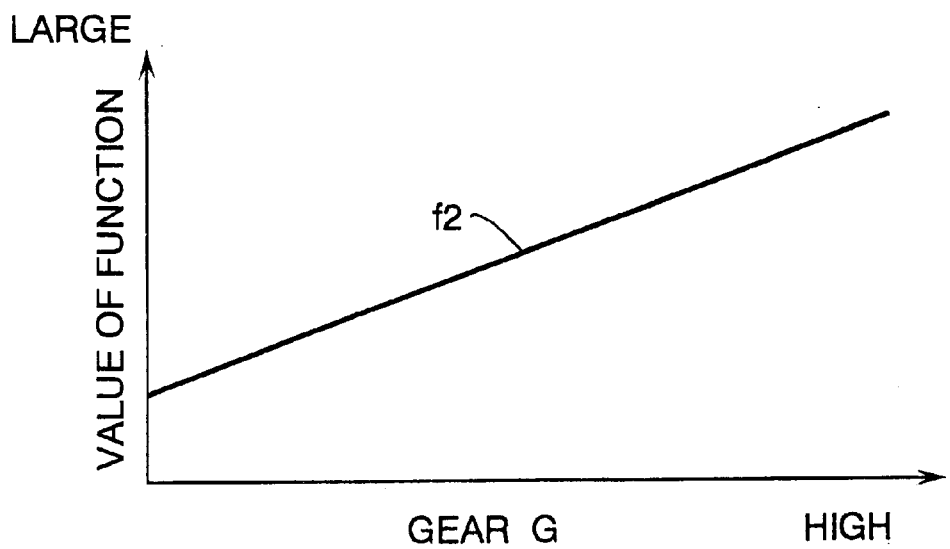
FIG. 21 is a diagram showing functional value relative to gear.

Thereafter, in the event where the idle switch (IDSW) 18 remains turned on, a judgement is made to determine whether a downslope flag F has to be set up to a state of "1" through steps S12 through S15. Specifically, judgements are made as to whether the brake switch (BRSW) 19 is on, i.e. whether the foot brake pedal 13 is stepped on, at step S12, as to whether a deceleration D is equal to or greater than a specified value A at step S13, and as to whether the slope flag Fg is up at step S14. When the answers to all of the judgements are affirmative, this indicates that the vehicle is traveling downhill with the foot brake applied, then the downslope flag F is set to the state "1" at step S15. As shown in FIG. 12, the specified value A is variable and takes a smaller value as the gear G becomes higher. Subsequently, after reading a shift signal indicating a gear G determined in the scheduled shift control map M1 as set forth in FIG. 2 at step S16, a critical speed increase or difference Fv and a critical duration of acceleration Ft are set at steps S16 and S17, respectively. The critical speed difference Fv is used to judge amplitude of an increase in vehicle speed since stepping on the accelerator pedal 15 and given as a speed difference of the vehicle speed V from the on-idle vehicle speed Vi. The critical speed difference Fv is given as a function f1 of on-idle vehicle speed Vi, absolute value of slop g and gear G and determined in a function map shown by a conceptualized diagram in FIG. 14. In this instance, the value of function f1 becomes greater with an increase in on-idle vehicle speed Vi as shown in FIG. 15 and, however, becomes smaller as the absolute value of slop g and/or the gear G becomes higher as shown in FIGS. 16 and 17, respectively. The critical duration of acceleration Ft is given as a function f2 of throttle opening TVO, absolute value of slop g and gear G and determined in a function map shown by a conceptualized diagram in FIG. 18. In this instance, the value of function f2 becomes smaller with an increase in on-idle vehicle speed Vi as shown in FIG. 19 and, however, becomes greater as the absolute value of slop g and/or the gear G becomes higher as shown in FIGS. 20 and 21, respectively.

In the event where the answer to any one of the judgements made at steps S12, S13 and S114 is negative or after the critical speed difference Fv and the critical duration of acceleration Ft have been determined, a judgement is made at step S19 as to whether the slope flag Fg has been up. When the slope flag Fg is down, this indicates that the vehicle is traveling on a level road, then after resetting the downslope flag F to the state of "0" at step S20, the flow chart logic orders return to step S1 for another downslope judgement. On the other hand, when the answer to the judgement made at step S19 is affirmative, this indicates that the downslope on which the vehicle is traveling is steeper than the critical downslope specified by the first slope K1, then a judgement is made at step S21 as to whether the idle switch (IDSW) 18 remains turned on. When the answer to the judgement is affirmative, this indicates that the accelerator pedal 15 remains released, the flow chart logic orders return to step S1 for another downslope judgement. On the other hand, when the answer to the judgement is negative, this indicates that the accelerator pedal 15 remains stepped on, then judgements are subsequently made as to whether the speed difference (V−Vi) is greater than the critical speed difference Fv at step S22 and whether the timer count t indicating the duration of acceleration is longer than the critical duration of acceleration Ft at step S23. When the answer to at least one of the judgements is affirmative, after resetting the downslope flag F to the state of "0" at step S20, the flow chart logic orders return to step S1 for another downslope judgement. That is, when the accelerator pedal 15 remains stepped on for a period of time longer than the critical duration of acceleration Ft, the downslope flag F is reset even when the vehicle provides an increase in speed less than the critical speed difference Fv and the timer count t is used for a control backup time. On the other hand, when the answers to both judgements are negative, the flow chart logic orders return to step S1 for another downslope judgement.

Figure 22:
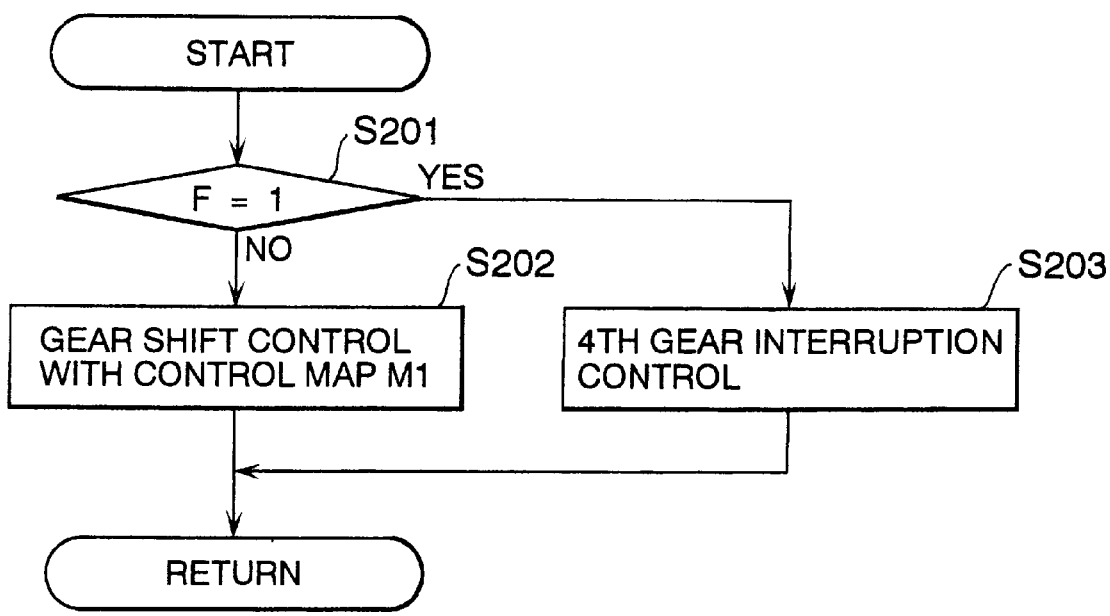
FIG. 22 is a flow chart illustrating the shift control sequence routine.

FIG. 22 is a flow chart illustrating the gear shift control sequence routine. When the flow chart logic commences and control proceeds to a function block at step S201 where a judgement is made as to whether the downslope flag is up. When the downslope flag F is down, the ordinary gear shift control in which a gear shift is caused according to the scheduled gear shift and lockup control map M1 shown in FIG. 2 is executed at step S202. On the other hand, when the downslope flag F is up, forth gear interruption control is executed at step S203. In the forth gear interruption control, a down shift to the third gear is caused if the vehicle is traveling with the fourth gear.

Figure 23:
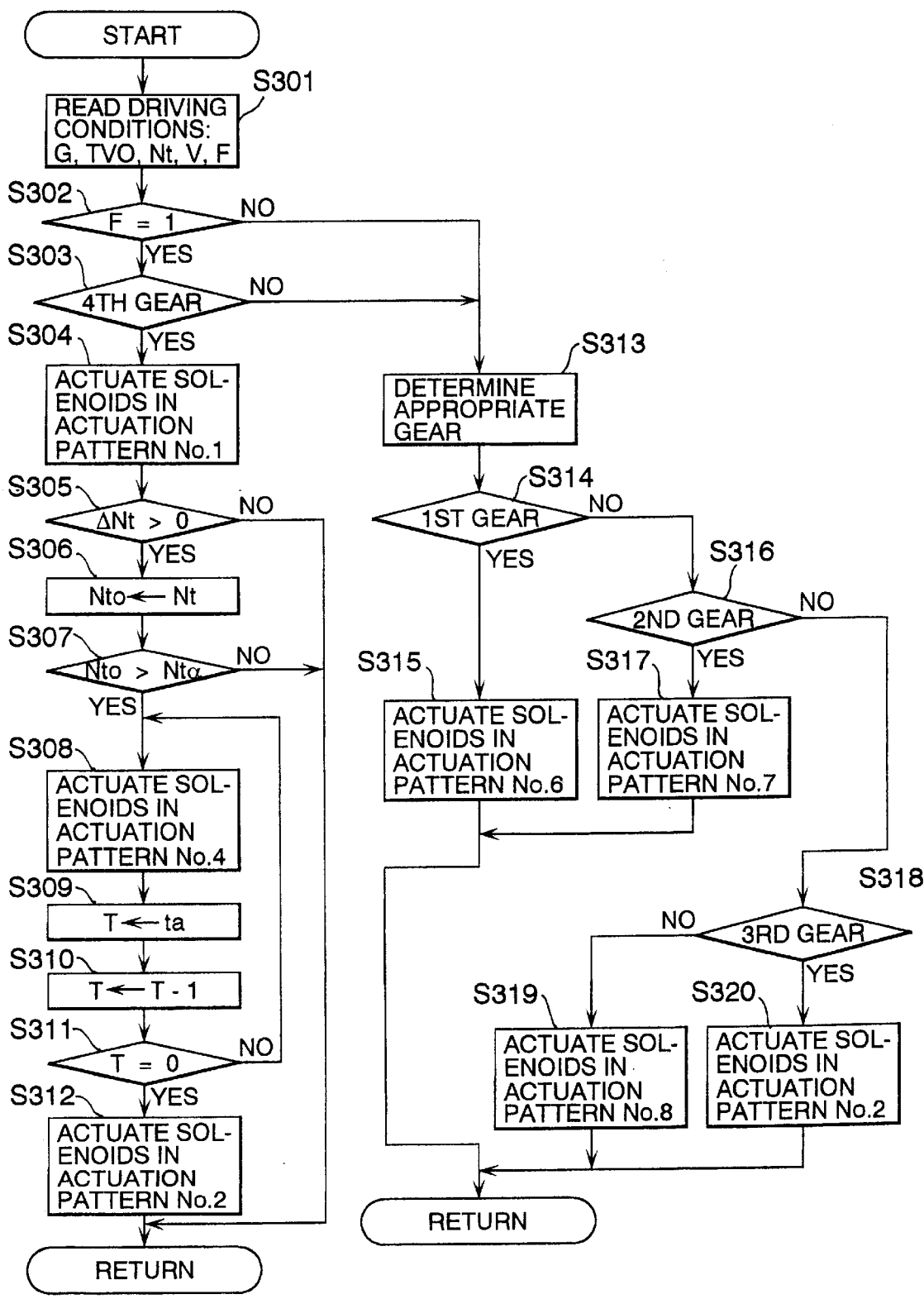
FIG. 23 a flow chart illustrating the downslope gear shift control sequence routine.

FIG. 23 is a flow chart illustrating a sequence routine of the downslope gear shift control including the forth gear interruption control during traveling downhill. When the flow chart logic commences and control proceeds to a function block at step S301 where signals are read to find a gear G, a throttle opening TVO, a turbine speed Nt, a vehicle speed V and the state of the downslope flag F. Judgements are subsequently made as to whether the downslope flag F is up at step S302 and whether the gear G is the fourth (4G) at step S303. The answers to both judgements are affirmative, this indicates that the vehicle is traveling downhill with the fourth gear, then the solenoids SOL1–SOL3 are actuated in the actuation pattern No. 1 set forth in FIG. 9 to cause a down shift to the third gear. That is, while the vehicle is traveling downhill with the engine throttle 14 remaining closed, when there is a demand for a fourth-to-third (4-3) gear shift, the solenoid valves SOL1–SOL3 are all turned off to apply hydraulic pressure to the coast clutch 45, the servo release pressure chamber 100c of the servo control device 100 and the 3-4 clutch 52 and, however, to shut off application of hydraulic pressure to the servo apply pressure chamber 100b of the servo control device 100, locking up the coast clutch 45 once so as to permit transmission of torque between the rear wheels 3R and 3L and the engine 5, thereby applying engine brake.

Figure 24:
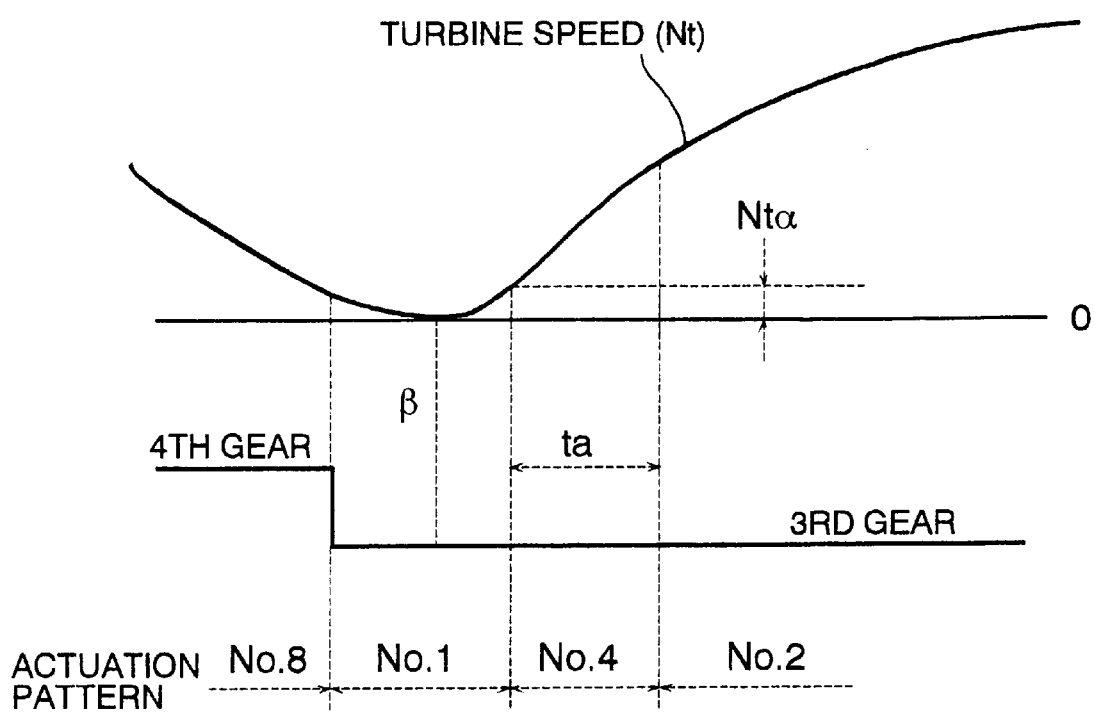
FIG. 24 is a time chart showing the downslope gear shift control.

Thereafter, at step S305, a judgement is made as to whether a change rate ΔNt of turbine speed Nt is greater than 0 (zero). As seen in a time chart shown in FIG. 24, the turbine speed Nt generally drops during deceleration and, however, rises when a down shift occurs during deceleration. For this reason, the judgement concerning the change rate ΔNt of turbine speed having become greater than 0 (zero) is made to confirm that the 4-3 down shift has occurred. When the change rate ΔNt of turbine speed Nt is still less than 0 (zero), the flow chart logic orders return to step S301 for another downslope gear shift control. When it is confirmed that the 4-3 down shift has occurred, after taking the turbine speed Nt as a reference turbine speed Nto at step S306, a judgement is subsequently made at step S307 as to whether the reference turbine speed Nto has risen greater than a critical turbine speed Ntα. When the reference turbine speed Nto is still less than the critical turbine speed Ntα, the flow chart logic orders return to step S301 for another downslope gear shift control. On the other hand, when the reference turbine speed Nto has risen beyond the critical turbine speed Ntα, then the solenoids SOL1–SOL3 are actuated in the actuation pattern No. 4 as set forth in FIG. 9 to interrut application of engine brake for a specified period of time ta as shown in FIG. 24. That is, when the reference turbine speed Nto reaches the critical turbine speed Ntα, the solenoid valves SOL1 and SOL2 are turned off and the solenoid SOL3 is turned off so as to shut off introduction of hydraulic pressure to the coast clutch 45, both servo apply and servo release pressure chambers 100b and 100c of the servo control device 100 and, however, to introduce hydraulic pressure to the 3-4 clutch 52 only, as a result of which lockup of the coast clutch 45 is interrupted for the period of time ta, so that no engine brake is applied. Subsequently, after a timer count T is set to the specified time ta at step S309, the timer count T is changed by a decrement of 1 (one) at step S310. After repeating the actuation of solenoids SOL1–SOL3 in the actuation pattern No. 4 until the timer count T reaches 0 (zero) at step S311, the solenoids SOL1–SOL3 are re-actuated in the actuation pattern No. 2 as set forth in FIG. 9 at step S312. That is, after the period of time ta, the solenoid valves SOL1 is turned on and the solenoids SOL2 and S013 are turned off or remain tuned off so as to introduce hydraulic pressure into the 3-4 clutch 52, both servo apply and servo release pressure chambers 100b and 100c of the servo control device 100, as a result of which engine brake is ineffective during lockup of the coast clutch 45 and the 4-3 down shift occurs without a shift shock.

When the answer to the judgement made at step S305 or at step S307 is negative, this indicates that an occurrence of a 4-3 down-shift is not confirmed or that, while a 4-3 down shift has occurred, the turbine speed Nto is still below than the critical turbine speed Ntα, the flow chart logic orders return to step S301 for another downslope gear shift control.

In the event where the downslope flag F is down at step S302 or the gear G is not fourth (4G) at step S303 while the downslope flag F is up, the flow chart logic proceeds to step S313 where a gear G to which a gear shift is made is determined in the scheduled gear shift and lockup control map M1 shown in FIG. 2. Subsequently, a judgement is made at step S314 as to whether the selected gear G is the first (1G). When the first gear (1G) is selected, after actuating the solenoids SOL1–SOL3 in the actuation pattern No. 6 as set forth in FIG. 9 to provide the first gear (1G) at step S315, the flow chart logic orders return to step S301 for another downslope gear shift control. When the first gear (1G) is not selected, another judgement is made at step S316 as to whether the selected gear G is the second (2G). When the second gear (2G) is selected, after actuating the solenoids SOL1–SOL3 in the actuation pattern No. 7 as set forth in FIG. 9 to provide the second gear (1G) at step S317, the flow chart logic orders return to step S301 for another downslope gear shift control. When neither first gear (1G) nor second gear (2G) is selected, another judgement is made at step S318 as to whether the selected gear G is the third (3G). When neither second gear (2G) nor third gear (3G) is selected, after actuating the solenoids SOL1–SOL3 in the actuation pattern No. 8 as set forth in FIG. 9 to maintain the fourth gear (4G) at step S319, the flow chart logic orders return to step S301 for another downslope gear shift control. On the other hand, when the third gear (3G) is selected, after actuating the solenoids SOL1–SOL3 in the actuation pattern No. 2 as set forth in FIG. 9 to provide the third gear (3G) at step S320, the flow chart logic orders return to step S301 for another downslope gear shift control.

Figure 25:
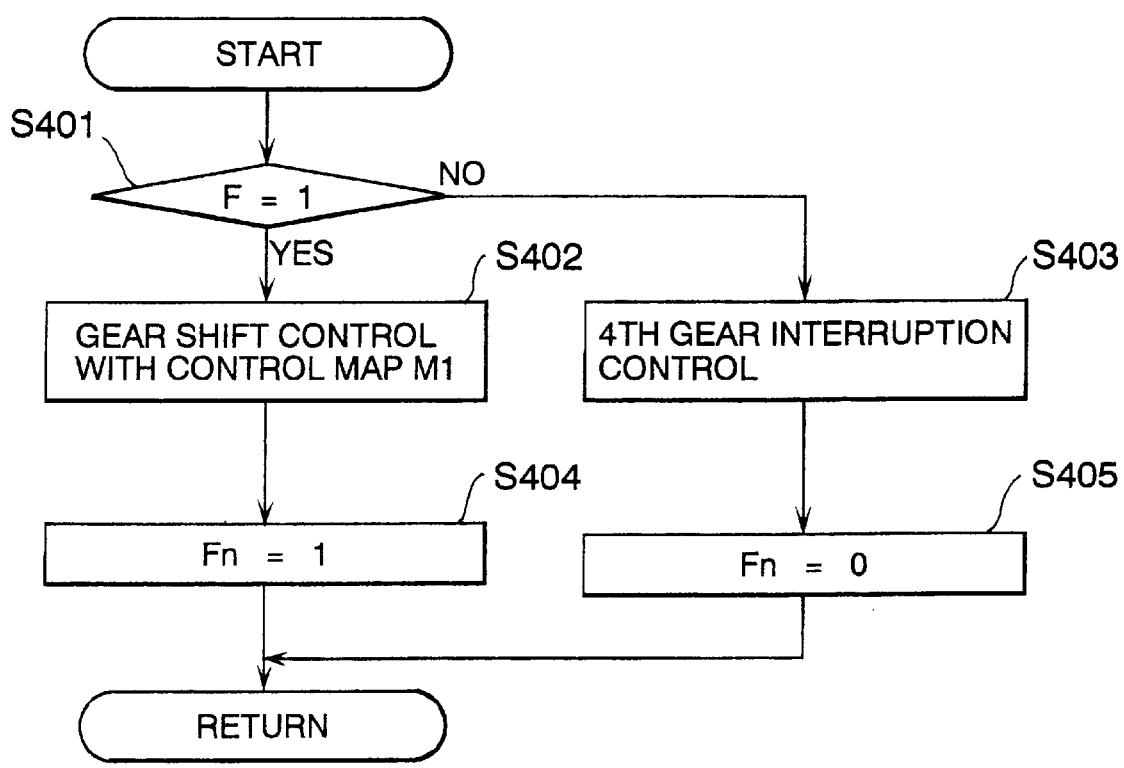
FIG. 25 is a flow chart illustrating the flag up and down control sequence routine.

FIG. 25 is a flow chart illustrating the sequence routine of slip restraint control for restraining slippage of the lockup clutch 31 during a downslope gear shift. When the flow chart logic commences and control proceeds to a function block at step S401 where a judgement is made as to whether the downslope flag F is up. The state of the downslope flag F is stored in the RAM 143 at step S15 in the downslope judgement sequence routine shown in FIG. 11. When the answer to the judgement is affirmative, the forth gear interruption control is executed to cause a 4-3 down shift at step S402 and a slip restriction flag Fn is set to a state of "1" for restriction of slippage of the lockup clutch 31 following the 4-3 down shift at step S404. On the other hand, when the answer to the judgement is negative, the forth gear (4G) remains permitted at step S403 and the slip restriction flag Fn is set to a state of "0" for allowance for slippage of the lockup clutch 31 at step S405.

Figure 26:
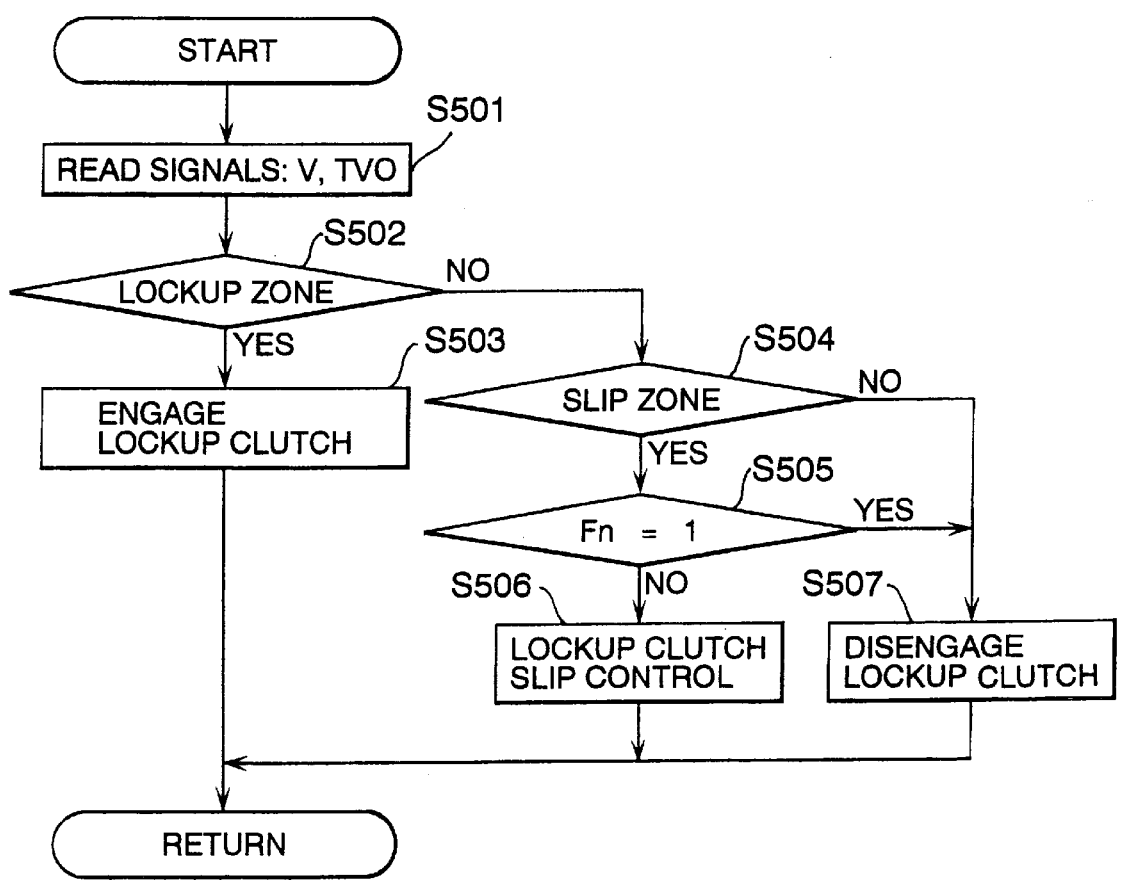
FIG. 26 is a flow chart illustrating the lockup clutch control sequence routine.

FIG. 26 is a flow chart illustrating the sequence routine of lockup clutch control. When the flow chart logic commences and control proceeds to a function block at step S501 where signals are read to find a vehicle speed V and a throttle opening TVO. Subsequently, a judgement is made at step S502 as to whether the driving condition defined by the vehicle speed V and throttle opening TVO is within the lockup zone of the scheduled gear shift and lockup control map M1 in which the lockup clutch 31 is completely engaged. When the driving condition is within the lockup zone, the duty solenoid valve 62 is operated at a duty ratio of 100% to engage the lockup clutch 31 completely at step S503. On the other hand, when the driving condition is out of the lockup zone, a judgement is made at step S504 as to whether the driving condition is within the slip control zone (SL) of the scheduled gear shift and lockup control map M1 in which the lockup clutch 31 is engaged with some slippage so as to allow the pump 25 and turbine 26 of the torque converter 21 to rotate relatively to each other. When the driving condition is within the slip control zone (SL), another judgement is subsequently made at step S505 as to whether the slip restriction flag Fn is up. When the answer to the judgement is negative, the duty solenoid valve 62 is operated at a specified duty ratio to allow the lockup clutch 31 to slip at step S506. On the other hand, when the driving condition is out of the slip control zone and/or the slip restriction flag Fn is up, the duty solenoid valve 62 is operated at a duty ratio of 0% to permit the lockup clutch 31 to operate in the converter mode in the third gear (3G) to which a down shift is made in the downslope gear shift control at step S507.

Although engagement of the lockup clutch is interrupted or prohibited in a gear which is provided in the downslope gear shift control due to traveling downhill, it may be done to relax engagement of the lockup clutch more in the gear provided in the downslope gear shift control than in the gear provided due to changes in driving conditions other than a change in downslope.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lockup control system for controlling engagement of a lockup clutch for a fluid coupling through which driving torques is transmitted to a transmission gear mechanism of an automatic transmission from an engine, said lockup clutch coupling an input element and an output element of said fluid coupling together while locked and releasing the input element and the output element of said fluid coupling to allow relative rotation between the input element and the output element of said fluid coupling while unlocked, said lockup control system comprising:

driving condition detection means for detecting driving conditions of the vehicle including at least a slope of road on which the vehicle is traveling;

lockup control means for controlling said lockup clutch in different modes including a lockup mode in which said lockup clutch is completely locked and a slip mode in which said lockup clutch is engaged but allowed to slip while said driving condition is in a predetermined range;

shift control means for shifting the transmission gear mechanism into desired gears according to said driving conditions; and control means for controlling said shift control means to cause a gear shift of the transmission gear mechanism to a gear which engine brake is more effective, and for controlling said lockup control means to unlock said lockup clutch to release the input element and the output element of said fluid coupling, even while said lockup control means puts said lockup clutch in said slip mode when said gear shift is caused when said driving condition detection means detects a downhill slope greater than a specific slope.

2. A lockup control system as defined in claim 1, wherein said control means controls said shift control means to cause a gear shift of said transmission gear mechanism to a second gear in which engine brake is more effective than in a first gear when said detection of a downhill slope greater than said specified slope is made while said transmission gear mechanism is in said first gear, and on the other hand when there occurs a non-gear shift from said first gear to said second gear due to said detection of a downhill slope greater than said specified slope, said lockup control means to cause the lockup clutch to allow relative rotation between the input element and the output element of the fluid coupling in said first gear, and, when said gear shift from said first gear to said second gear is caused due to said detection of a downhill slope greater than said specified slope, said lockup control means to unlock the lockup clutch in said second gear.

3. A lockup control system for controlling engagement of a hydraulically controlled lockup clutch which locks and unlocks a torque converter which is comprised of a pump fastened to an engine output shaft and a turbine fastened to an input shaft of a transmission gear mechanism of an automatic transmission through which driving torque is transmitted to said transmission gear mechanism from an engine, said transmission gear mechanism cooperative with h plurality of hydraulically controlled friction coupling elements which are selectively coupled and uncoupled to place said transmission gear mechanism into desired gears and said lockup clutch being locked to couple said pump and said turbine of said torque converter together and unlocked to release said pump and said turbine of said torque converter from each other to allow relative rotation between said pump and said turbine of said torque converter, said lockup control system comprising:

a driving condition monitor for detecting driving conditions of the vehicle including at least a throttle opening of an engine throttle, an engine speed, a turbine speed of said turbine, a vehicle speed of the vehicle and application of brakes;

a hydraulic control circuit including shift control solenoid valves for controlling hydraulic pressure supplied to said friction coupling elements to selectively couple and uncouple and lockup control solenoid valves for controlling hydraulic pressure supplied to said lockup clutch to bring said lockup clutch into engagement and disengagement; and a control module for control of said shift control solenoid valves and of said lockup control solenoid valves on the basis of a shift control map according to said driving conditions;

said control module calculating a slope of a downhill on which the vehicle is traveling based on said engine speed, said throttle opening and said vehicle speed, controlling said shift control solenoid valves to cause a gear shift of said transmission gear mechanism to a lower gear in which engine brake is more effective than in a gear before an occurrence of said gear shift, and for controlling said lockup control solenoid valves to vary said hydraulic pressure supplied to said lockup clutch so as to unlock said lockup clutch to release said pump and said turbine of said torque converter, even while said lockup clutch control solenoid valves allows said lockup clutch to slip during an occurrence of said gear shift when said downhill slope is greater than a specified slope.

4. A lockup control system as defined in claim 1, wherein said driving condition detection means further detects application of brakes and a specified deceleration rate of the vehicle, and said control means performs a fourth to third shift down and unlocking said lockup clutch to release the input element and the output element of said fluid coupling.

* * * * *